US012812689B2

(12) United States Patent
Lee et al.

(10) Patent No.: US 12,812,689 B2
(45) Date of Patent: Nov. 24, 2026

(54) METHODS AND APPARATUS FOR BEAM FAILURE RECOVERY IN NEW RADIO NON-TERRESTRIAL NETWORKS

(71) Applicant: InterDigital Patent Holdings, Inc., Wilmington, DE (US)

(72) Inventors: Moon Il Lee, Melville, NY (US); Paul Marinier, Brossard (CA); Young Woo Kwak, Woodbury, NY (US); Jonghyun Park, Syosset, NY (US); Fumihiro Hasegawa, Westmount (CA); Janet Stern-Berkowitz, Little Neck, NY (US); Dylan Watts, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 259 days.

(21) Appl. No.: 18/696,439

(22) PCT Filed: Sep. 29, 2022

(86) PCT No.: PCT/US2022/045211
§ 371 (c)(1),
(2) Date: Mar. 28, 2024

(87) PCT Pub. No.: WO2023/055921
PCT Pub. Date: Apr. 6, 2023

(65) Prior Publication Data

US 2024/0389159 A1 Nov. 21, 2024

Related U.S. Application Data

(60) Provisional application No. 63/249,817, filed on Sep. 29, 2021.

(51) Int. Cl.
*H04W 74/0833* (2024.01)
*H04B 7/06* (2006.01)

(52) U.S. Cl.
CPC .... *H04W 74/0833* (2013.01); *H04B 7/06964* (2023.05)

(58) Field of Classification Search
CPC ........................ H04W 74/0833; H04B 7/06964
See application file for complete search history.

(56) References Cited

U.S. PATENT DOCUMENTS

2019/0132110 A1* 5/2019 Zhou .................. H04B 7/06964
2019/0173740 A1* 6/2019 Zhang ................ H04B 7/06964
(Continued)

FOREIGN PATENT DOCUMENTS

EP 3739933 A1 11/2020
WO WO 2020092561 A1 5/2020

OTHER PUBLICATIONS

Qualcomm, "New WID on Extending current NR operation to 71 Ghz", 3GPP Tdoc RP-193229, 3GPP TSG RAN Meeting #86, Sitges, Spain, Dec. 9-12, 2019, 5 pages.
(Continued)

*Primary Examiner* — Jael M Ulysse
(74) *Attorney, Agent, or Firm* — Majid Albassam

(57) ABSTRACT

Methods and apparatus for recovering from a beam failure in a non¬terrestrial communication network are provided. A method may include receiving (610) configuration information indicating a first set of RSs including one or more first RSs associated with a first BWP of a cell, and second sets of RSs that each include one or more second RSs associated with a second BWP. The method may include determining (620) a candidate set of RSs from the plurality of second sets of RSs based on any of a location and a timing advance value associated with the WTRU, selecting (630) an RS from the candidate set of RSs that have measured signal characteristics that satisfy a threshold, and transmitting (640) a PRACH transmission associated with the selected RS in the one of the one or more second BWPs associated with the selected
(Continued)

RS during a period in which current operation with the first BWP is suspended.

18 Claims, 8 Drawing Sheets

(56) References Cited

U.S. PATENT DOCUMENTS

| | | | | |
|---|---|---|---|---|
| 2019/0190582 | A1* | 6/2019 | Guo | H04B 17/17 |
| 2019/0200248 | A1* | 6/2019 | Basu Mallick | H04B 7/06964 |
| 2019/0254042 | A1* | 8/2019 | Cirik | H04B 7/06964 |
| 2019/0305840 | A1* | 10/2019 | Cirik | H04B 7/0639 |
| 2019/0306875 | A1* | 10/2019 | Zhou | H04B 7/0617 |
| 2020/0044723 | A1* | 2/2020 | Cirik | H04W 76/27 |
| 2020/0053613 | A1* | 2/2020 | Cirik | H04B 7/088 |
| 2020/0137821 | A1* | 4/2020 | Cirik | H04B 17/327 |
| 2023/0180254 | A1* | 6/2023 | Cirik | H04L 5/0044 370/329 |
| 2023/0284279 | A1* | 9/2023 | Zhou | H04W 72/04 370/328 |
| 2025/0098020 | A1* | 3/2025 | Jeon | H04W 76/30 |

OTHER PUBLICATIONS

3GPP TSG RAN Meeting #86, RP-193259, "New SID: Study on supporting NR from 52.6GHz to 71 GHZ," Dec. 9-12, 2019, 3 pages.

3rd Generation Partnership Project; Technical Specification Group Radio Access Network; NR; Physical layer procedures for data (Release 16), 3GPP TS 38.214 V16.6.0 (Jun. 2021), 82 pages.

3GPP TR 38.805, V14.0.0 (Mar. 2017), 3rd Generation Partnership Project; Technical Specification Group Radio Access Network; Study on New Radio access technology; 60 GHz unlicensed spectrum (Release 14), 17 pages.

3GPP TS 38.321, Medium Access Control (MAC) protocol specification, Release 16; v16.0.0 dated Mar. 2020.

Third Generation Partnership Project, "Technical Specification Group Radio Access Network; Study on Scenarios and Requirements for Next Generation Access Technologies; (Release 16)," 3GPP TR 38.913 V16.0.0 (Jul. 2020), 40 pages.

NEC: "Remaining issues for NR NTN" 3GPP Draft; R1-2107016, 3rd Generation Partnership Project (3GPP), Mobile Competence Centre; 650, Route Des Lucioles; F-06921 Sophia-Antipolis Cedex, France, vol. RAN WG1, No. e-meeting; Aug. 16, 2021-Aug. 27, 2021, Aug. 6, 2021, Retrieved from the internet; URL: https://ftp.3gpp.org/tsg_ran/WG1_RL1/TSGR1_106-e/Docs/R1-2107016.zip, 6 pages.

3GPP TSG RAN Meeting #80, RP-181435, "New SID: Study on NR beyond 52.6GHZ," Jun. 11-14, 2018, 4 pages.

3GPP TS 38.331 3rd Generation Partnership Project; Technical Specification Group Radio Access Network; NR; Radio Resource Control (RRC) protocol specification, Release 16, v.16.0.0 Mar. 2020, 141 pages.

3GPP TS 38.213 V16.1.0, 3rd Generation Partnership Project; Technical Specification Group Radio Access Network; NR; Physical layer procedures for control (Release 16), Mar. 2020, 156 pages.

3GPP TR 38.807, V16.0.0 (Dec. 2019), 3rd Generation Partnership Project; Technology Specification Group Radio Access Network; Study on requirements for NR beyond 52.6 GHZ (Release 16), 68 pages.

3GPP TS 38.212 V16.6.0 (Jun. 2021), 3rd Generation Partnership Project; Technical Specification Group Radio Access Network; NR; Multiplexing and channel coding (Release 16), 15 pages.

3GPP TS 37.213 V16.6.0 (Jun. 2021), 3rd Generation Partnership Project; Technical Specification Group Radio Access Network; "Physical layer procedures for shared spectrum channel access" (Release 16), 27 pages.

* cited by examiner

UE Sends PRACH-2 to Indicate Beam is BRS-3

METHODS AND APPARATUS FOR BEAM FAILURE RECOVERY IN NEW RADIO NON-TERRESTRIAL NETWORKS

This application is a U.S. National Stage Application under 35 U.S.C. 371 of International Patent Application No. PCT/US2022/045211, filed Sep. 29, 2022, which claims the benefit of U.S. Provisional Application No. 63/249,817, filed Sep. 29, 2021, which is incorporated herein by reference in its entirety.

This application claims the benefit of U.S. Provisional Application No. 63/249,817, filed Sep. 29, 2021. The contents of this prior application are incorporated herein by reference in its entirety.

FIELD OF THE INVENTION

This disclosure may generally pertain to methods and apparatus for beam failure recovery in non-terrestrial networks.

BACKGROUND

Non-terrestrial networks (NTN) facilitate deployment of wireless networks in areas where land-based antennas are impractical, for example, due to geography or cost. It is envisioned that, coupled with terrestrial networks, NTN will enable truly ubiquitous coverage of 5G networks. Initial Rel-17 NTN deployments support basic talk and text anywhere in the world. However, it is expected that further releases coupled with proliferation of next-generation low-orbit satellites will enable enhanced services such as web browsing.

A basic NTN comprises an aerial or space-borne platform which, via a gateway (GW), transports signals from a land-based based gNB to a Wireless Transmit Receive Unit (WTRU) and vice-versa. The current 3GPP Rel-17 NR NTN specification supports power class 3 WTRUs with omnidirectional antenna and linear polarization, or a very small aperture antenna (VSAT) terminal with directive antenna and circular polarization. Support for LTE-based narrowband Internet-of-Things (NB-IoT) and eMTC type devices are also expected to be standardized in Rel-17, based on recommendations from 3GPP TR 36.736 [3]. Regardless of device type, it is assumed all Rel-17 NTN WTRUs are Global Navigation Satellite System (GNSS) capable.

SUMMARY

An embodiment may be directed to a method in a Wireless Transmit/Receive Unit (WTRU). The method may include receiving configuration information. The configuration information indicating a first set of reference signals (RSs) comprising one or more first RSs associated with a first bandwidth part (BWP) of a cell, and a plurality of second sets of RSs. Each of the plurality of second sets of RSs comprises one or more second RSs, and each of the one or more second RSs is associated with one of one or more second BWPs of the cell. The method may also include determining a candidate set of RSs from the plurality of second sets of RSs based on any of a location and a timing advance value associated with the WTRU. The method may further include selecting an RS from the candidate set of RSs that have measured signal characteristics that satisfy a threshold. The method may then include transmitting a physical random access channel (PRACH) transmission associated with the selected RS in the one of the one or more second BWPs associated with the selected RS during a period in which current operation with the first BWP is suspended.

An embodiment may be directed to a WTRU including a transceiver configured to receive configuration information. The configuration information indicating a first set of reference signals (RSs) comprising one or more first RSs associated with a first bandwidth part (BWP) of a cell, and a plurality of second sets of RSs. Each of the plurality of second sets of RSs comprises one or more second RSs, and each of the one or more second RSs is associated with one of one or more second BWPs of the cell. The WTRU may also include a processor configured to determine a candidate set of RSs from the plurality of second sets of RSs based on any of a location and a timing advance value associated with the WTRU, and to select an RS from the candidate set of RSs that have measured signal characteristics that satisfy a threshold. The transceiver may be configured to transmit a physical random access channel (PRACH) transmission associated with the selected RS in the one of the one or more second BWPs associated with the selected RS during a period in which current operation with the first BWP is suspended.

An embodiment may be directed to a WTRU including means for receiving configuration information. The configuration information indicating a first set of reference signals (RSs) comprising one or more first RSs associated with a first bandwidth part (BWP) of a cell, and a plurality of second sets of RSs. Each of the plurality of second sets of RSs comprises one or more second RSs, and each of the one or more second RSs is associated with one of one or more second BWPs of the cell. The WTRU may also include means for determining a candidate set of RSs from the plurality of second sets of RSs based on any of a location and a timing advance value associated with the WTRU, means for selecting an RS from the candidate set of RSs that have measured signal characteristics that satisfy a threshold, and means for transmitting a physical random access channel (PRACH) transmission associated with the selected RS in the one of the one or more second BWPs associated with the selected RS during a period in which current operation with the first BWP is suspended.

BRIEF DESCRIPTION OF THE DRAWINGS

A more detailed understanding may be had from the detailed description below, given by way of example in conjunction with the drawings appended hereto. Figures in such drawings, like the detailed description, are provided as examples. As such, the Figures and the detailed description are not to be considered limiting, and other equally effective examples are possible and likely. Furthermore, like reference numerals ("ref.") in the Figures ("FIGs.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components, and circuits have not been described in detail, so as not to obscure the following description. Further, embodiments and examples not specifically described herein may be practiced in lieu of, or in combination with, the embodiments and other examples described, disclosed, or otherwise provided explicitly, implicitly and/or inherently (collectively "provided") herein.

Figure 1A:
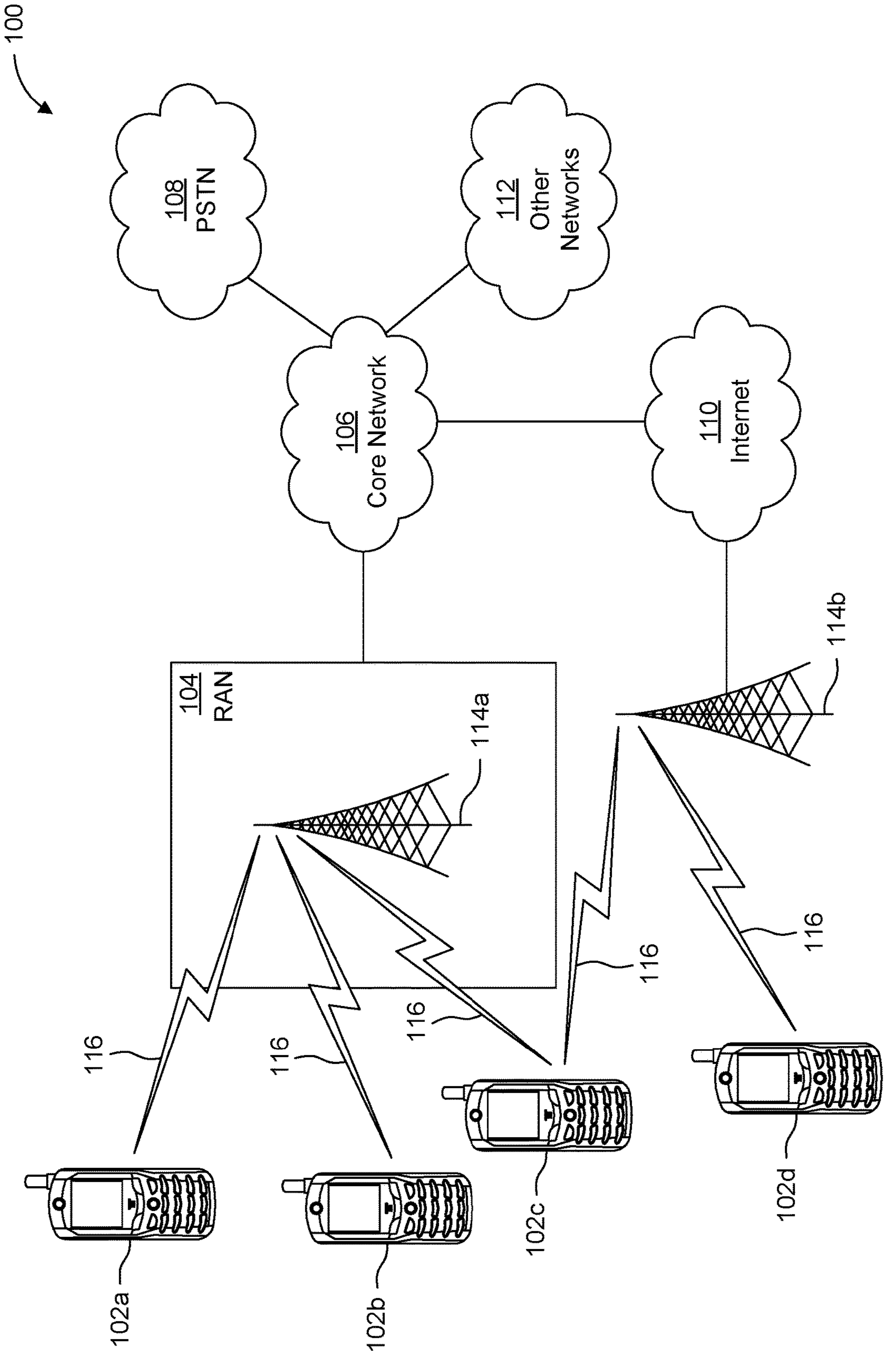
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B, a Home Node B, a Home eNode B, a gNB, a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
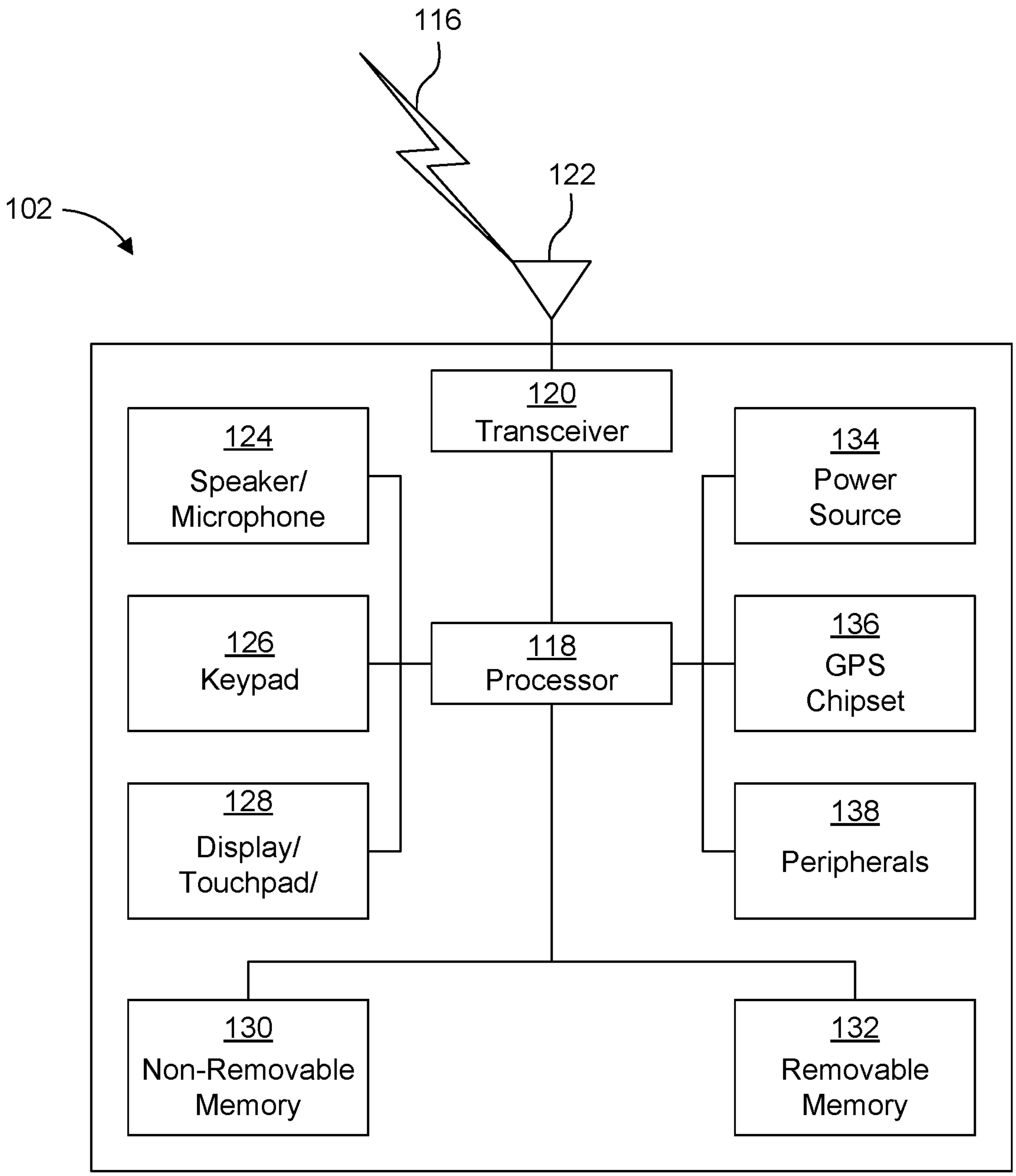
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
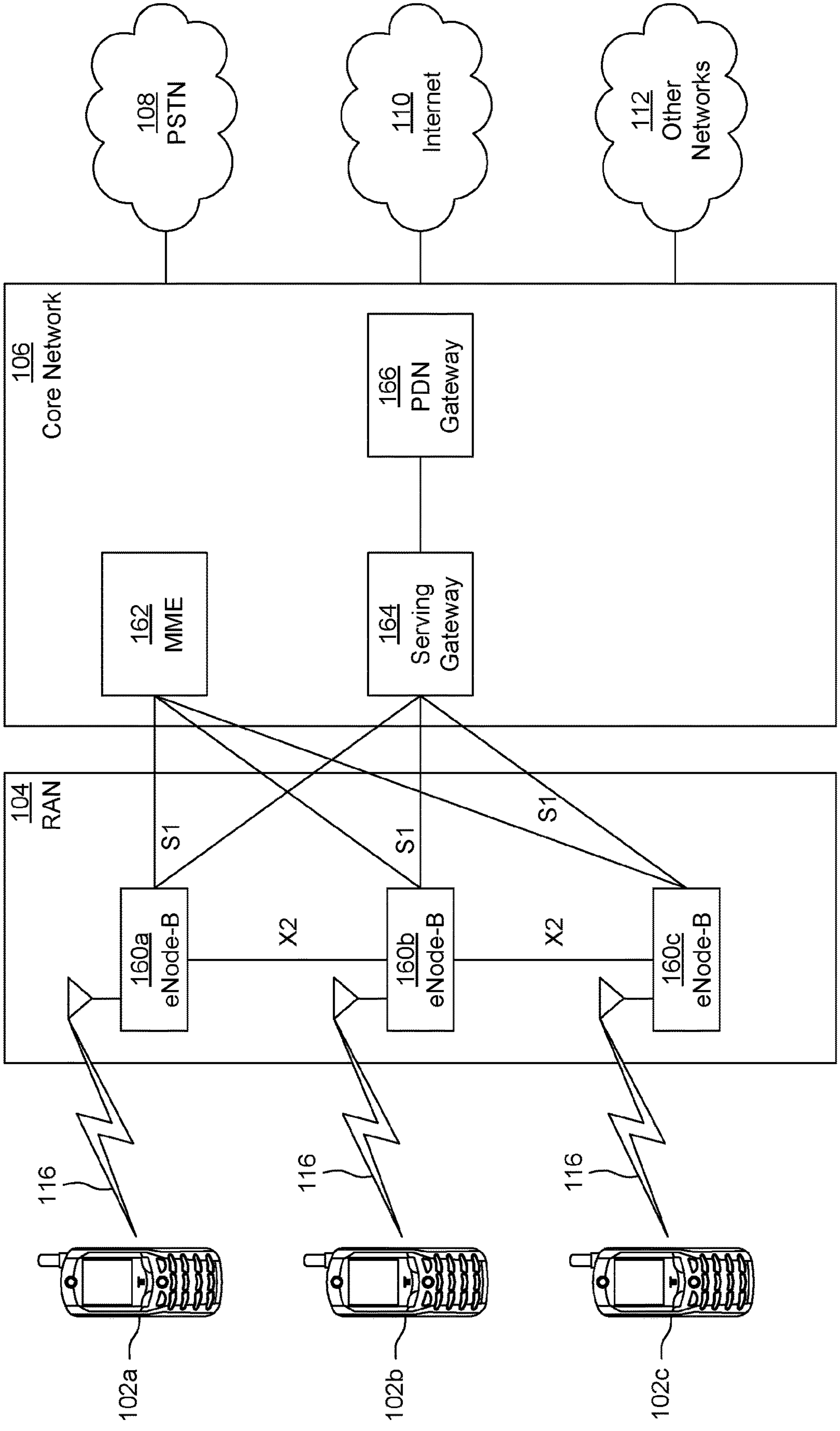
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In some embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain example embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz.

In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
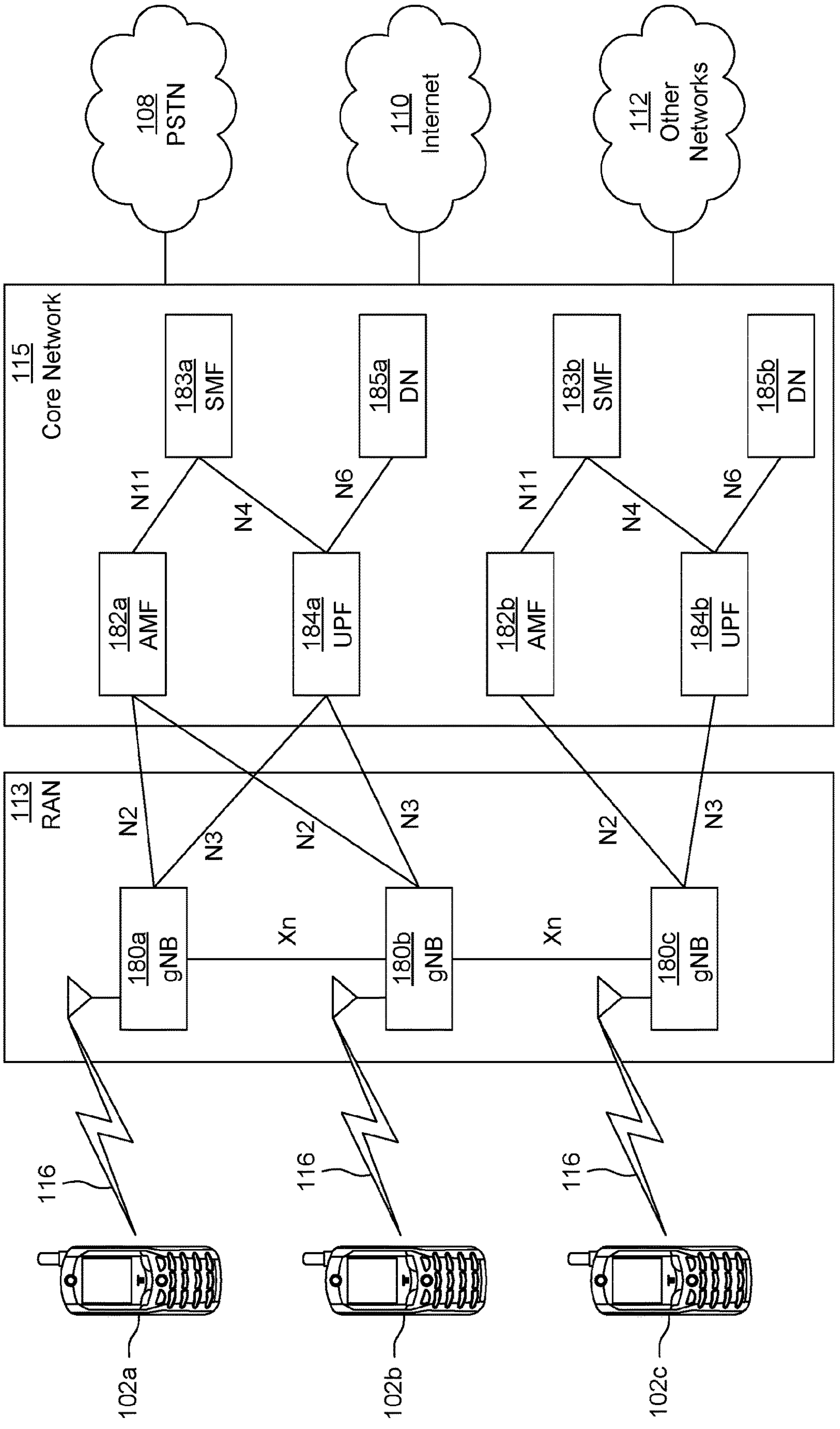
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Aerial or space-borne platforms may be classified in terms of orbit, with Rel-17 standardization focusing on low-earth orbit (LEO) satellites with altitudes in the range of 300-1500 km and geostationary earth orbit (GEO) satellites with altitudes at 35,786 km. Other platform classifications, such as medium-earth orbit (MEO) satellites with altitudes in the range of 7000-25000 km and high-altitude platform stations (HAPS) with altitudes in the range of 8-50 km, may be assumed to be implicitly supported. Satellite platforms are further classified as having a "transparent" or "regenerative" payload. Transparent satellite payloads implement frequency conversion and RF amplification in both uplink and downlink, with multiple transparent satellites possibly connected to one land-based gNB. Regenerative satellite payloads can implement either a full gNB or gNB distributed unit (DU) onboard the satellite. Regenerative payloads may perform digital processing on the signal including demodulation, decoding, re-encoding, re-modulation and/or filtering.

Figure 2:
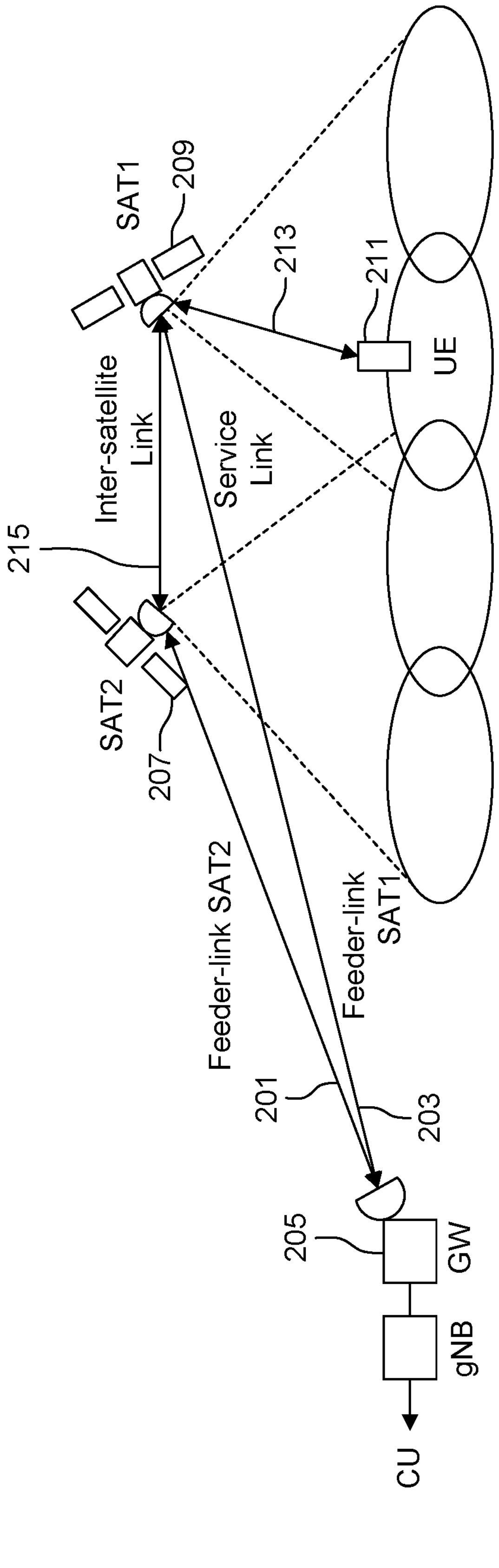
FIG. 2 is a diagram illustrating various interfaces in a non-terrestrial network.

With reference to FIG. 2, which is a diagram illustrating various interfaces in an NTN, the following radio interfaces are defined in NTN:

Feeder-link: A wireless link between a GW and satellite, such as links 201 and 203 between gNB 205 and satellites 207 and 209, respectively.

Service link: A radio link, such as link 213 between a satellite, e.g., 209, and a WTRU, e.g., 211.

Inter-satellite Link (ISL): A transport link, such as 215, between two satellites, e.g., 203 and 207. The ISL is supported by (e.g., only by) regenerative payloads and may be a 3GPP radio or proprietary optical interface.

Depending on the satellite payload configuration, different 3GPP interfaces may be used for each radio link. In a transparent payload, the NR-Uu radio interface may be used for both the service link and feeder-link. For a regenerative payload, the NR-Uu interface may be used on the service link, and a satellite radio interface (SRI) may be used for the feeder-link. Presently, 3GPP has not defined ISLs for Rel-17. A detailed User Plane and/or Control Plane (UP/CP) protocol stack for each payload configuration can be found in 3GPP TR 38.821 [1]; Section 5.1 and 5.2.

An NTN satellite can support multiple cells, where each cell may include one or more satellite beams. Satellite beams cover a footprint on earth (like a terrestrial cell) and can range in diameter from 100-1000 km in LEO deployments, and 200-3500 km diameter in GEO deployments. Beam footprints in GEO deployments remain fixed relative to earth. In LEO deployments, on the other hand, the area covered by a beam and/or cell may change over time due to satellite movement relative to the face of the earth. This beam movement can be classified as "earth moving" where the LEO beam moves continuously across the earth, or "earth fixed" where the beam is steered to remain covering a fixed location until a new cell overtakes the coverage area in a discrete and coordinated change.

Due to the altitude of NTN platforms and beam diameter, the round-trip time (RTT) and maximum differential delay may be significantly larger than that of terrestrial systems. In a typical transparent NTN deployment, RTT can range from 25.77 ms (LEO @ 600 km altitude) to 541.46 ms (GEO) and maximum differential delay from 3.12 ms to 10.3 ms. The RTT of a regenerative payload may be approximately half that of a transparent payload, for example, as a transparent configuration comprises both the service and feeder links, whereas the RTT of a regenerative payload comprises just the service link. To minimize impact to existing NR systems (e.g., to avoid preamble ambiguity or time reception windows conflict), prior to initial access, a WTRU may perform timing pre-compensation.

The pre-compensation procedure may include the WTRU obtaining its position via GNSS, and the feeder-link (or common) delay and satellite position via satellite ephemeris data. The satellite ephemeris data may be periodically broadcast in system information, and may contain the satellite speed, direction, and velocity. The WTRU may then estimate the distance (and thus delay) from the satellite and may add the feeder-link delay component to obtain the full WTRU-gNB RTT, which is then used to offset timers, reception windows, or timing relations. It may be assumed that frequency compensation is performed by the network.

Other key enhancements in Rel-17 NTN concern WTRU mobility and measurement reporting. As captured in 3GPP TR 38.821, the difference in Reference Signal Received Power (RSRP) between cell center and cell edge is not as pronounced as in terrestrial systems. This, coupled with the much larger region of cell overlap, for example, results in traditional measurement-based mobility being less reliable in an NTN environment. 3GPP has therefore introduced new conditional handover and measurement reporting triggers relying on location and time, with details to be confirmed. Enhanced mobility, such as conditional handover, is of special interest in LEO deployments where, due to satellite movement, even a stationary WTRU is expected to perform mobility approximately every 7 seconds (depending on deployment characteristics).

In a non-terrestrial network, multiple beams may be used to provide better quality of service by increasing signal strength, where each beam covers a sub-area within the satellite coverage. A satellite may transmit multiple beams simultaneously to support WTRUs in each beam. Based on the network deployment scenario, the satellite beam could be considered as a physical cell if an individual physical cell identity (PCI) is assigned to each beam. If a single PCI is shared by multiple satellite beams, a cell may have multiple beams within the cell.

When a single PCI is shared by multiple satellite beams, two options could be considered for frequency resource association with a beam, e.g., Deployment scenario #1 or Deployment scenario #2. In Deployment scenario #1, a same frequency resource (e.g., carrier, BWP) may be used for all satellite beams in the cell. In Deployment scenario #2, a different frequency resource may be used for each beam to reduce inter-beam interference. For example, a frequency reuse factor (FRF) larger than 1 can be used across beams within a cell.

Figure 3:
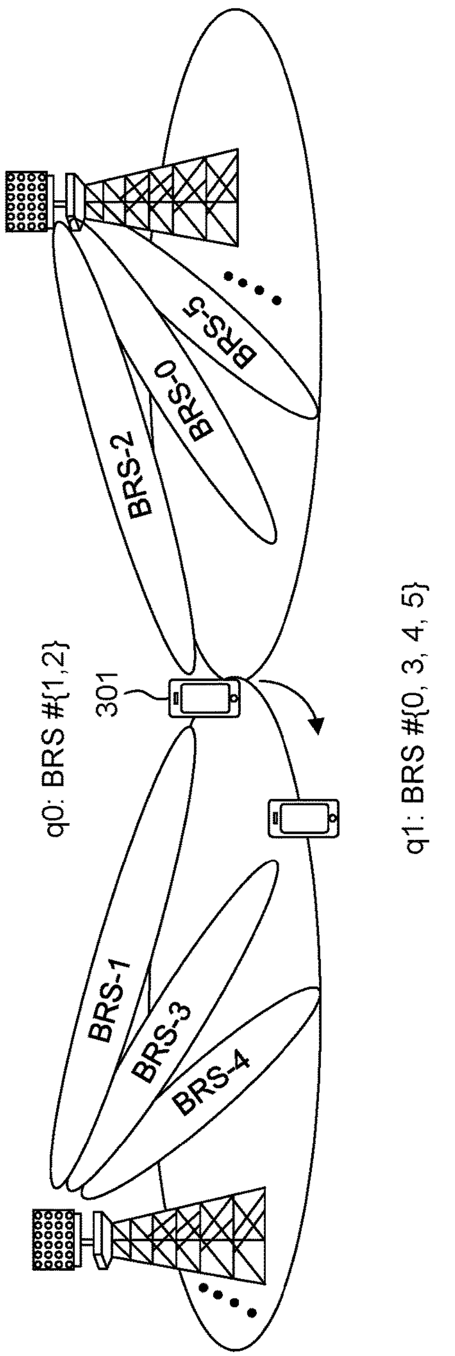
FIG. 3 is a diagram illustrating various examples of beam failure detection Reference Signals (q0) and new candidate beam Reference Signals (q1)

With reference to FIG. 3, next will be described a beam recovery procedure (e.g., link recovery procedure) in accordance with TS 38.213 [1]. As shown in FIG. 3, radio link quality of beams in $\overline{q}_0$ may be monitored. The beams in $\overline{q}_0$ may include beam reference signals (e.g., beam measurement reference signals) BRS-1 and BRS-2, as seen in FIG. 3. A WTRU 301 may measure radio link quality (e.g., BLER) of beams in $\overline{q}_0$ and, if the radio link quality of the (e.g., all) beams in $\overline{q}_0$ is below a threshold ($Q_{out,LR}$), the WTRU 301 may consider it a beam failure instance. In each indication period, the WTRU 301 may determine whether to indicate to the upper layer the beam failure instance. If any beam in the set is above the threshold, no indication is issued to the upper layer. The indication period may be determined based on the shortest periodicity of Beam Failure Detection-Reference Signal (BFD RS) in $\overline{q}_0$, low bounded by 10 ms.

In an embodiment, beam failure recovery may be triggered, for example, when the Beam Failure Instance Counter (e.g., BFI_COUNTER) is equal to or larger than the threshold (e.g., beamFailureInstanceMaxCount). Upper layer (e.g., MAC) may issue a request to the PHY layer for the set of {beam index, L1-RSRP} that meets new candidate beam requirements in new candidate beam set ($\overline{q}_1$) (comprising, for instance, BRS-0, BRS-3, BRS-4, and BRS-5, as seen in the example of FIG. 3). If there is at least one beam in set ($\overline{q}_1$) that meets the requirements, a PRACH procedure for beam recovery may be triggered. Otherwise, upper layer may keep requesting to PHY layer until MAC receives new candidate beam.

According to an embodiment, PRACH transmission may be sent to recover a beam. For example, if the BFR timer (e.g., beamFailureRecoveryTimer) is running, the WTRU may send a PRACH within contention-free PRACH resources dedicated to BFR. Otherwise, the WTRU may send a PRACH within contention-based PRACH similar to initial access.

Figure 4:
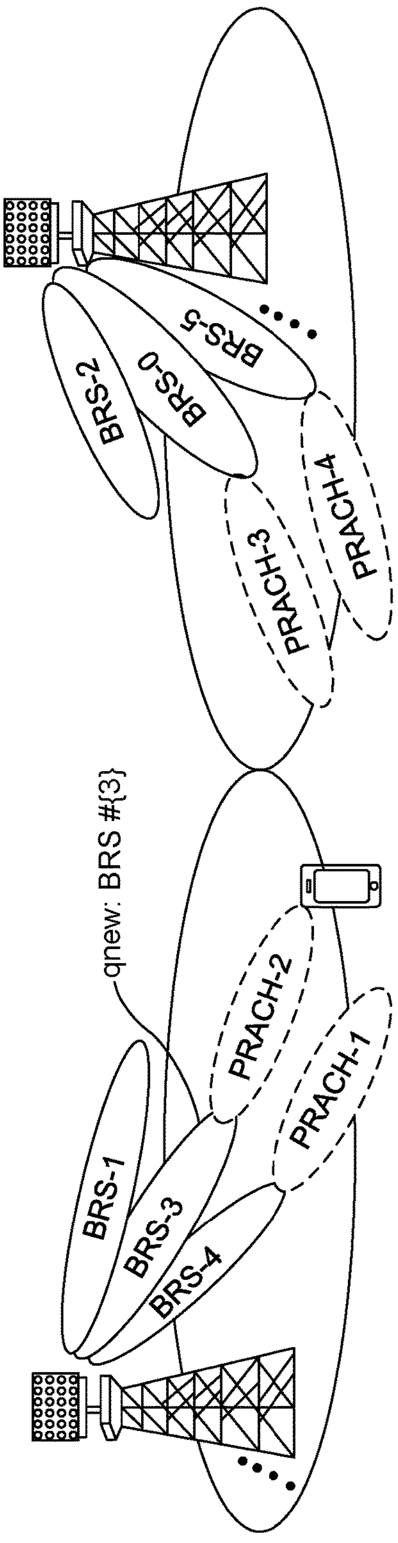
FIG. 4 is a diagram illustrating beam failure recovery operations in a non-terrestrial network.

FIG. 4 depicts an example situation in which all four beams in set ($\overline{q}_1$) meet the requirements, and thus four PRACHs are issued, one corresponding to each beam in set ($\overline{q}_1$). In the example of FIG. 4, the WTRU may monitor for a gNB response. For example, if the WTRU sent a contention-free PRACH, the WTRU may monitor a recovery search space indicated by an identifier or parameter (e.g., recoverySearchSpaceId) for PDCCH with C-RNTI or MCS-C-RNTI using the same beam used for PRACH transmission until the WTRU receives a MAC-CE (Control Element) activation command for a TCI state or TCI state list update for the CORESETs. However, if the WTRU sent a contention-based PRACH, the WTRU may perform the same steps as for initial access.

In an embodiment, the WTRU may send a corresponding PUCCH for DL transmission. For instance, in one embodiment, after 28 symbols from a last symbol of a first PDCCH reception in the recovery search space (e.g., indicated by recoverySearchSpaceId) with C-RNTI or MCS-C-RNTI, until the WTRU receives an activation command for a spatial relation information parameter (e.g., PUCCH-spatialRelationInfo), the WTRU may transmit a PUCCH with the same beam used for PRACH ($q_{new}$).

According to an embodiment, the WTRU may perform CORESET #0 beam update. For example, in one embodiment, after 28 symbols from a last symbol of a first PDCCH reception in the recovery search space (e.g., indicated by recoverySearchSpaceId) with C-RNTI or MCS-C-RNTI, the WTRU may update CORESET #0 beam as new candidate beam indicated ($q_{new}$).

In NTN, a beam may be associated with a Bandwidth Part (BWP) (or a carrier) when multiple satellite beams share a same Physical Cell ID (PCI), and frequency reuse factor (FRF) is greater than 1 to reduce inter-beam interference. Therefore, existing beam management procedures and/or beam failure recovery procedures in 5G NR system, which associate with beams within the active BWP only, may not work for NTN.

In areas where beams overlap, a gNB may configure overlapping beams in q0, where each beam may be associated with a different BWP. However, in existing NR systems, all BFD RS should be within the active BWP. If a WTRU performs measurement for the beams in q0, the WTRU may have to perform BWP switching frequently, which may negatively impact the WTRU performance and battery consumption. Furthermore, while a WTRU is measuring the BFD RS outside of the active BWP, the WTRU may not be able to transmit and/or receive (Tx/Rx) in the active BWP.

Neighboring beams may be considered as new candidate beam and one or more neighboring beams may be associated with a different BWP. However, all new candidate beams should be within the active BWP in the current 5G NR system. Searching all new candidate beams require more time as the WTRU needs to switch to multiple BWPs. Furthermore, while a WTRU is measuring the new candidate beams outside the active BWP, the WTRU may not be able to transmit and/or receive (Tx/Rx) in the active BWP.

A single BFR search space is configured in the current 5G NR system. The BFR search space associated $q_{new}$ should be located within the associated BWP (e.g., if BWP and beam are associated). However, while monitoring BFR search space, a WTRU may not be able to Tx/Rx in the active BWP.

A WTRU may transmit or receive a physical channel or reference signal according to at least one spatial domain filter. The term "beam" may be used herein to refer to a spatial domain filter.

The WTRU may transmit a physical channel or signal using the same spatial domain filter as the spatial domain filter used for receiving a Reference Signal (RS), such as CSI-RS, or a Synchronization Signal (SS) block. The WTRU transmission may be referred to as "target", and the received RS or SS block may be referred to as "reference" or "source". In such case, the WTRU may be said to transmit the target physical channel or signal according to a spatial relation with a reference to such RS or SS block.

The WTRU may transmit a first physical channel or signal according to the same spatial domain filter as the spatial domain filter used for transmitting a second physical channel or signal. The first and second transmissions may be referred to as "target" and "reference" (or "source"), respectively. In such case, the WTRU may be said to transmit the first (target) physical channel or signal according to a spatial relation with a reference to the second (reference) physical channel or signal.

A spatial relation may be implicit, configured by Radio Resource Control (RRC), or signaled by MAC CE or Downlink Control Information (DCI). For example, a WTRU may implicitly transmit PUSCH and Demodulation Reference Signal (DM-RS) of PUSCH according to the same spatial domain filter as a Sounding Reference Signal (SRS) indicated by a SRS resource indicator indicated in DCI or configured by RRC. In another example, a spatial relation may be configured by RRC for an SRS resource indicator or signaled by MAC CE for a PUCCH. Such spatial relation may also be referred to as a "beam indication".

The WTRU may receive a first (target) downlink channel or signal according to the same spatial domain filter or spatial reception parameter as a second (reference) downlink channel or signal. For example, such association may exist between a physical channel, such as PDCCH or PDSCH, and its respective DM-RS. At least when the first and second signals are reference signals, such association may exist when the WTRU is configured with a quasi-colocation (QCL) assumption type D between corresponding antenna ports. Such association may be configured as a transmission configuration indicator (TCI) state. A WTRU may be indicated an association between a CSI-RS or SS block and a DM-RS by an index to a set of TCI states configured by RRC and/or signaled by MAC CE. Such indication may also be referred to as a "beam indication".

In an embodiment, a WTRU may be configured with a set of beam measurement reference signals (BMRSs) and the WTRU may perform measurement of one or more of BMRSs, where each BMRS may be associated with a bandwidth part (BWP).

According to certain embodiments, when a WTRU performs measurement of a BMRS within the set, if the BMRS is associated with an inactive BWP, one or more of the following may occur: the WTRU may switch to the BWP associated with the BMRS and measure the BMRS during a measurement gap, the WTRU may not transmit or receive a signal in the active BWP within the measurement gap configured, indicated, or determined; and/or the WTRU may perform measurement of a subset of BMRSs that may be determined based on the associated BWP (or BWP-id).

It is noted that an inactive BWP herein may be considered a BWP that is different from an active BWP, where an active BWP may be considered a BWP in which the WTRU may transmit and receive signals. The active BWP may be a BWP wherein a WTRU monitors one or more search spaces for DCI with, for example, Cell-Radio Network Temporary Identifier (C-RNTI) and/or System Information-Radio Network Temporary Identifier (SI-RNTI), etc. The active BWP may be a BWP wherein a WTRU transmits configured transmission (e.g., CG-PUSCH, periodic SRS, periodic CSI reporting). The active BWP may be a BWP wherein a WTRU performs Radio Link Monitoring (RLM) measurement.

As mentioned above, in some embodiments, the WTRU may switch to the BWP associated with the BMRS and may measure the BMRS during a measurement gap. According to an embodiment, the measurement gap may be determined based one or more of the following: measurement gap parameters, measurement gap type, and/or measurement gap length. The measurement gap parameters may be configured by a gNB and may include at least one of: measurement gap type, measurement gap length, and/or measurement gap start and end timing. The measurement gap type may be determined based on WTRU behaviours during the measurement gap in active BWP and/or inactive BWP. In some embodiments, a WTRU may perform one or more of following based on the measurement gap type: measuring reference signal (e.g., CSI-RS, SSB, TRS), monitoring PDCCH, transmitting an event-triggered UL signal (e.g., PRACH, PUCCH, SRS), transmitting a periodic UL signal according to a configuration (e.g., CG-PUSCH, SRS), and/or receiving broadcast signals (e.g., SIB, paging). In an example, a WTRU may perform measurement of reference signal(s) in a target inactive BWP in a first measurement gap type, while the WTRU may perform measurement of reference signal(s) and monitoring of PDCCH in a target inactive BWP in a second measurement gap type. The measurement gap length may be determined based on at least one of: the first symbol (or slot) location of BMRSs to be measured, the last symbol (or slot) location of BMRSs to be measured, a time gap between one or more BMRSs to be measured, and/or associated BWP (or BWP-id). For example, a first measurement gap length (or type) may be used when a WTRU performs measurement of BMRSs associated with a first BWP, and a second measurement gap length (or type) may be used when a WTRU performs measurement of BMRSs associated with a second BWP, where the first BWP and the second BWP may have a different number of BMRSs associated with the BWP.

As introduced above, according to certain embodiments, the WTRU may not transmit or receive a signal in the active BWP within the measurement gap configured, indicated, or determined. In this case, the WTRU may not monitor PDCCH in the active BWP within the measurement gap. The WTRU may skip or drop transmitting a UL transmission scheduled (e.g., PUSCH, PUCCH, SRS) or pre-configured (e.g., periodic CSI reporting, configured grant PUSCH, periodic SRS) in the active BWP within the measurement gap.

In an embodiment, a WTRU may perform measurement of a subset of BMRSs, where the subset may be determined based on the associated BWP (or BWP-id). For example, when a WTRU is on an active BWP, the WTRU may measure one or more BMRSs associated with the active BWP within the set; the other BMRSs associated with inactive BWP(s) may be measured when one or more conditions are met.

For example, one of the conditions, for measuring the other BMRSs associated with inactive BWP(s), may include the WTRU receiving a measurement reporting trigger or configuration for the BMRSs associated with inactive BWP(s). For instance, a WTRU may be indicated, by a gNB, to measure a BWP (e.g., inactive BWP, target BWP), and then the WTRU may measure BMRSs associated with the BWP (or BWP-id). A WTRU may measure one or more (e.g., all) BMRSs configured, and the WTRU may switch BWP (e.g., temporarily) to measure a BMRS associated with an inactive BWP (e.g., target BWP), where a measurement gap may be applied when the WTRU measures one or more BMRS associated with an inactive BWP.

Another of the conditions, for measuring the other BMRSs associated with inactive BWP(s), may include the measurement quality of one or more of BMRSs associated with an active BWP is below a threshold or, alternatively, the measurement quality of all BMRSs associated with the active BWP is below a threshold.

Another condition, for measuring the other BMRSs associated with inactive BWP(s), may include the quality of the BWP (active BWP) is below a threshold, where the quality of a BWP may be determined based on one or more of following:

- N consecutive measurements that are out-of-sync with RLM measurement (e.g., hypothetical BLER of RLM-RS is below a threshold), wherein N may be a predetermined number (e.g., N=1 or 3) or configured via a higher layer signalling (e.g., SIB, RRC, MAC-CE);
- An RS to measure the quality of BWP may be configured or determined; the measurement quality (e.g., RSRP, reference signal received quality (RSRQ), signal to interference and noise ratio (SINR)) of the RS may be used as the quality of the BWP. The RS may be an SS/PBCH block (SSB) associated with the BWP. A WTRU may receive association information between SSB and BWP via higher layer signalling (e.g., SIB, RRC, MAC-CE);
- N consecutive beam failures are detected;
- The WTRU's location is outside of the beam coverage associated with the BWP; and/or
- A WTRU-specific Timing Advance (TA) value determined or calculated by the WTRU is larger than a threshold.

Another condition may include the WTRU's location being within a zone (e.g., close to a cell and/or beam edge) at a given time, wherein the zone may be a geographical location determined, configured, or indicated by a network (e.g., a gNB). The zone may change over time and the WTRU may receive the association information between zone and time. The WTRU may determine zone information based on satellite ephemeris and broadcasting information (e.g., SIB, NTN-SIB) which may include coordinates of beams or cells within the satellite.

The set of BMRSs may be interchangeably used with beam failure detection reference signal (BFD RS) set, q0, new candidate beam set, and q1. The BMRS may be interchangeably used with beam, RS, BFD RS, new candidate beam RS.

Figure 5:
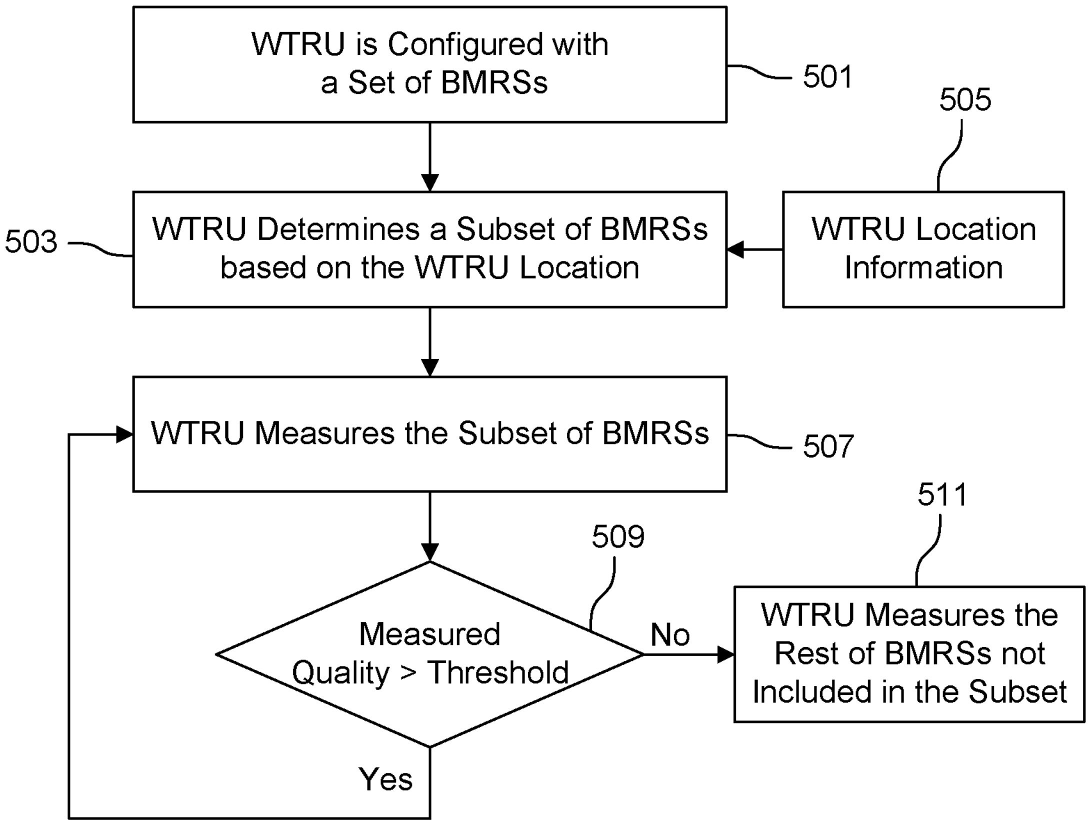
FIG. 5 is a flowchart illustrating beam failure recovery in a non-terrestrial network in accordance with an embodiment.

FIG. 5 is a flowchart illustrating a method of beam failure recovery in a NTN in accordance with an embodiment. As shown in step 501, the WTRU may receive from the network a configuration of a set of BMRSs to measure. In step 503, the WTRU may determine a subset of those BMRSs to measure for corresponding beam quality. As noted above, this subset may be selected as a function of information as to the location of the WTRU (shown at 505). For example, the WTRU may measure the BMRSs of beams in the vicinity of the WTRU. Alternately or additionally, the beam subset may comprise the beams in an active BWP for the WTRU.

In step 507, the WTRU may measure the selected subset of BMRSs, and, in step 509, the WTRU may determine whether the BMRSs meet a threshold quality requirement. If they do, then the WRU may continue to monitor those BMRSs (i.e., processing loops back to step 507). If they do not, then the WTRU may start to measure the other BMRSs in the configures set of BMRs (step 511).

In another embodiment, a WTRU may be configured with a BWP for beam measurement, q0 measurement, and/or q1 measurement, which may be referred to as default BWP and interchangeably used with initial BWP, BWP with BWP-id=0, BFD BWP, and BFR BWP. A WTRU may switch to a default BWP when the WTRU performs beam measurement (e.g., beams associated with inactive BWPs). According to an embodiment, a measurement gap may be used when the WTRU measures beams in a default BWP. The default BWP may be a BWP containing SSBs and/or CORESET #0.

In an embodiment, a WTRU may be configured with one or more search spaces (e.g., PDCCH search space) to monitor, and the one or more search spaces may be associated with one or more BWPs. The WTRU may monitor configured search spaces, wherein the WTRU may determine a subset of search spaces to monitor in accordance with one or more of the following: a search space associated with the active BWP; a search space associated with a specific BWP-id, where the BWP-id may be configured, indicated, and/or informed by a gNB via higher layer signalling (e.g., RRC or MAC-CE) or a L1-signaling (e.g., DCI); a search space associated with a BWP having a BWP quality higher than a threshold; a search space associated with a specific CORESET-id (e.g., CORESET #0); and/or a search space associated with a specific beam-id (e.g., SSB-id, TCI state) (for example, a search space associated with a beam-id that may be in q0 and having an associated beam quality that is higher than a threshold).

A WTRU may be active in a particular BWP at a particular time. Therefore, if one or more search spaces associated with different BWPs are overlapping in time, the WTRU may monitor a subset of search spaces associated with the same BWP. When one or more search spaces are overlapping in time, a WTRU may determine a subset of search spaces to monitor based on one or more of: the BWP-id, the quality of the BWP, the WTRU's location and/or time, WTRU-specific TA value, and/or satellite position (or satellite ephemeris information).

In an example, a WTRU may determine to monitor a subset of search spaces associated with the lowest BWP-id among the BWP-ids associated with the search spaces. In another example, the WTRU may determine to monitor a subset of search spaces associated with the active BWP.

As another example, the WRU may determine to monitor a subset of search spaces based on the quality of BWP. For example, a WTRU may determine to monitor a subset of search spaces associated with a BWP having the highest BWP quality (e.g., RSRP, RSRQ, SINR).

As yet another example, the WTRU may determine to monitor a subset of search spaces based on the WTRU's location and/or time. For instance, a WTRU may determine a subset of search spaces to monitor as a function of the WTRU's geographical location at a given time (e.g., the WTRU is near the beam edge or in a beam overlapping area). In addition, as introduced above, in certain embodiments, the WTRU may determine to monitor a subset of search spaces based on a WTRU-specific TA value, and/or satellite position or satellite ephemeris information.

Hereafter, PDCCH search space may be interchangeably used with search space, SS, common search space, WTRU-specific search space.

In an embodiment, a WTRU may be configured with a set of BMRSs (e.g., q1) and the WTRU may perform measurement of a first subset of BMRSs. The WTRU may perform measurement of a second subset of BMRSs if one or more conditions are met from the measurement of the first subset of BMRSs.

According to an embodiment, the first subset of BMRSs may be determined based on WTRU location. For example, if a WTRU is in a specific location (e.g., zone) at a given time, the subset of BMRSs which may be close to the WTRU location may be determined as the subset. Additionally or alternatively, the first subset of BMRSs may be determined based on the quality of BWPs. For example, a WTRU may determine a first subset of BMRSs associated with one or more BWPs which may have a BWP quality higher than a threshold. Additionally or alternatively, the first subset of BMRSs may be determined based on BMRSs associated with an active BWP. Additionally or alternatively, the first subset of BMRSs may be determined based on the satellite ephemeris from which q0 and/or q1 beams are transmitted, e.g., the WTRU may determine the subset of q1 beams based on the satellite's motion and may update the subset of q1 beams at a preconfigured periodicity to account for movement of the satellite(s). Additionally or alternatively, the first subset of BMRSs may be determined based on the last beam the WTRU received from and/or transmitted to the satellite. For example, the WTRU may determine the first subset of q1 beams based on the beam the WTRU used most recently for DL or UL transmission. More specifically, for example, the WTRU may determine the first subset of q1 beams as those beams that are adjacent to the beam the WTRU used most recently. Additionally or alternatively, the first subset of BMRSs may be determined based on the q0 beams. For example, the WTRU may determine the first subset of q1 beams based on q0 beams, e.g., the first subset of q1 beams may be beams adjacent to the q0 beams. Additionally or alternatively, the first subset of BMRSs may be determined based on the WTRU receiving configuration information, from the network, of priorities associated with groups of beams, where the WTRU may determine the first subset of q1 beams from the group of beams based on the priority associated with each group. Additionally or alternatively, the first subset of BMRSs may be determined based on a Line of Sight and/or Non-Line-of-Sight (LOS/NLOS) indicator. Particularly, the WTRU may receive a LOS/NLOS indicator for each beam (e.g., indicating the likelihood that the associated each beam is in LOS of the WTRU, where the value of the indicator may be between 0 and 1) associated with a group of candidate beams/each candidate beam from the network. The WTRU may determine the first subset of q1 beams based on the LOS/NLOS indicator. Additionally or alternatively, the first subset of BMRSs may be determined based on the WTRU receiving assistance information about a group of candidate beams and/or about each candidate beam (e.g., expected/standard deviation/variance/range of phase drift for each beam, standard deviation/variance/range of L1-RSRP) from the network (e.g., gNB) before the WTRU conducts beam search. The WTRU may determine the first subset of q1 beams based on such assistance information. Alternately, the WTRU may determine the first subset of q1 beams based on such assistance information received from the network in combination with any of the information above (e.g., WTRU's location, ephemeris of the satellite, the last beam the WTRU received from/transmitted to the satellite, q0 beams the WTRU searched). An example of range of RSRP is the range between the lower and upper limits/values of L1-RSRP.

In some embodiments, the second subset of BMRSs may be at least one of the following: the rest of the BMRSs within the set that are not included in the first subset of BMRSs, the rest of the BMRSs not associated with the active BWP, and/or the BMRSs associated with one or more BWPs that have a BWP quality lower than a threshold.

According to certain embodiments, the one or more conditions relating to the first subset of BMRSs that are to be met to perform measurements of a second subset of BMRSs may include at least one of the following:

A WTRU is unable to find a BMRS within the first subset of BMRSs that has a beam quality higher than a threshold, wherein beam quality include at least one of RSRP, L1-RSRP, SINR, L1-SINR, RSRQ, and pathloss;

The beam quality of all BMRSs in the first subset is below a threshold;

A WTRU is unable to find a new candidate beam that meets new candidate beam requirements during a beam failure recovery procedure;

A counter reaches a predetermined number, wherein the counter is similar to the BFI_Counter, but applies (e.g., only applies) to the first subset (e.g., is increased when beam quality of all BMRSs in the first subset are below a threshold); and/or A validity timer configured or determined for the first subset of BMRSs has expired. For example, a validity time for the first subset of BMRSs may be determined based on satellite ephemeris received from the network (which ephemeris is associated with the satellite from which the BMRSs are transmitted) and/or the WTRU mobility. In this manner, the WTRU does not search for BMRSs that are out of coverage due to WTRU or satellite movement.

In an embodiment, a WTRU may be configured with one or more uplink resources that may be used to report/indicate determined or preferred BMRS information to a gNB, where each uplink resource may be associated with a BMRS and a BWP. When a WTRU determines a BMRS (e.g., $q_{new}$) and indicates the determined BMRS to a gNB, the WTRU may switch to a BWP associated with the determined BMRS and send a signal in the associated uplink resource if the uplink resource is associated with an inactive BWP. Otherwise, the WTRU may send a signal in the associated uplink resource without BWP switch. The uplink resource may be at least one of PRACH resource, PUCCH resource, and/or SRS resource. A gap may be used for the active BWP while the WTRU switches to a BWP associated with the determined BMRS. In certain embodiments, the WTRU may not perform a UL transmission in the active BWP during the gap. The gap may be referred to as at least one of UL Tx gap, transmission gap, UL gap, and suspend window, suspend window for UL Tx, and UL Tx suspend window. The WTRU may switch back to the active BWP within the gap when the WTRU finishes sending a signal in the uplink resource associated with the determined BMRS.

A WTRU may be configured with a set of BMRSs and each BMRS in the set may be associated with an uplink resource and a BWP, where the set of BMRSs may be a new candidate beam set. The WTRU may measure a BMRS in its associated BWP, and if the measured BMRS is determined as a new beam (e.g., $q_{new}$), the WTRU may send a signal in the associated uplink resource in the BWP.

The following example embodiments may enable monitoring of PDCCH in a recovery search space that may be in a different BWP than the currently active BWP. Such example embodiments may be useful, for instance, to support multi-BWP BFR operation.

The WTRU may be configured with at least one search space for BFR associated with a candidate beam, q1. Each search space may be in a configured BWP that may be different from the active BWP.

In some embodiments, the WTRU may switch its active DL and/or UL BWP between one or more BWPs to monitor PDCCH in the active bandwidth part in which beam failure occurred, as well as in bandwidth part(s) in which recovery search space(s) are configured at least for the purpose of PDCCH monitoring. The WTRU may monitor PDCCH in recovery search space(s) following initiation of a random access procedure for beam failure recovery as well as in search space sets configured at the time of beam failure detection.

The active BWP in which beam failure occurred may be referred to as a "source" BWP in the following discussion. The at least one BWP in which the WTRU monitors PDCCH for the purpose of beam failure recovery may be referred to as "candidate BWP". The WTRU may select at least one candidate BWP based on the quality of at least one candidate beam. For example, the WTRU may select a candidate BWP if the quality of a candidate beam in this BWP is higher than a threshold, or if the quality of a candidate beam in this BWP is higher than the best candidate beam in the active BWP.

In an embodiment, the WTRU may switch its active BWP to the selected candidate DL BWP and associated UL BWP prior to initiation of a random access procedure for beam failure recovery, and monitor PDCCH on at least one recovery search space on the candidate BWP.

In some embodiments, the WTRU may switch its active BWP according to a certain schedule or pattern while in a "recovery state". For example, the WTRU may enter a recovery state when one of the following events occurs: upon initiation of a random access procedure for beam failure; upon starting a beam failure recovery timer; upon transmission of a first PRACH following such initiation; and/or upon transmission of any PRACH while a beam failure recovery procedure is on-going.

For instance, the WTRU may exit a recovery state (i.e. go back to normal operation) when one of the following events occurs: upon completion or successful completion of beam failure recovery procedure; after reception of a first PDCCH in a recovery search space set or in a search space set of the source BWP; after transmission of PUCCH in response to such first PDCCH; upon expiry of a random access response window timer; and/or upon expiry of a beam failure recovery timer.

After exiting the recovery state, the WTRU may continue operating in the last DL and/or UL BWP that was active when exiting the recovery state. Upon initiation of a random access procedure for beam failure, the WTRU may switch the UL and or DL BWP for the transmission of PRACH on corresponding BWP.

According to certain embodiments, the WTRU may determine the schedule for BWP switching using at least one of the following techniques.

In an embodiment, the WTRU may obtain the schedule for switching from higher layer signaling such as via an RRC configuration. For example, such schedule or pattern may be included as part of a configuration for multi-BWP beam failure recovery. The schedule may indicate the times at which the WTRU switches the active BWP and the identity of the DL and/or UL BWP to switch to. Alternatively, the schedule may indicate, for at least one DL/UL BWP, a specified set of time periods expressed in terms of start time, periodicity, end time, and/or duration in units of symbols, slots, and/or frames. The WTRU may switch the active BWP at the end and beginning of each time period. The WTRU may switch to a specific BWP (e.g. the source BWP) at the beginning of a time period for which no BWP was explicitly indicated. Each time period and associated BWP may be configured along with a corresponding list of candidate beams (q1) on the BWP and possibly a BWP-specific random access response window for beam failure recovery.

In an embodiment, the WTRU may implicitly determine the schedule for switching based on configuration of at least one search space or search space set. For example, the at least one search space or search space may include: a search space set configured for the source BWP; a specific search space configured for the source BWP (e.g., BFR search space, receoverSearchSpace), where such configuration may be obtained by RRC signaling; and/or a search space identified by recovery search space ID for at least one candidate BWP.

For example, the WTRU may determine to switch BWP before a PDCCH monitoring occasion for a search space in a BWP different from the active BWP. The WTRU may switch at a fixed time offset prior to the first symbol of such PDCCH monitoring occasion, where such time offset may be signaled by RRC. In case PDCCH monitoring occasions of more than one search space in different BWPs overlap in time, the WTRU may determine which PDCCH should be monitored based on a priority order between BWPs. The priority order may be signaled by RRC or may implicitly be the source BWP or the candidate BWP other than the source BWP.

In an embodiment, the WTRU may switch BWP depending on quality measurements of at least one candidate beam on at least one BWP. For instance, the WTRU may determine to switch BWP if the quality of a candidate beam on a non-active BWP becomes higher than the quality of the best candidate beam on the active BWP plus a threshold that may be configured by higher layers.

In an embodiment, a WTRU may perform (e.g., only perform) a set of transmission and reception actions upon BWP switching if at least one of the following conditions is satisfied: the WTRU switches BWP for a reason other than beam failure recovery, the WTRU exits recovery state (as defined above), and/or the WTRU switches BWP to a source BWP (as defined above).

For example, the set of transmission and receptions actions subject to the above conditions may include at least one of: transmission on UL-SCH, transmission on RACH, monitoring PDCCH, e.g., possibly on search space sets other than recovery search space sets, transmission on PUCCH, CSI reporting, SRS transmission, reception of DL-SCH, e.g., from DL semi-persistent scheduling (SPS), re-initialization of suspended configured uplink grants, monitoring of LBT failure indications, and/or starting the BWP inactivity timer.

In an embodiment, the WTRU may receive configuration information for at least one "beam failure recovery BWP" or "recovery BWP". For example, such configuration information may include at least one of the following for each recovery BWP:

- The identity of a reference UL and/or DL BWP. In an embodiment, the WTRU may assume that at least a subset of the configuration of the reference BWP applies to the recovery BWP, for example, such subset may consist of location, bandwidth, subcarrier spacing, and some other common UL and DL parameters associated with the BWP;
- Configuration of other parameters governing PDCCH, PDSCH, PUSCH, SRS, PUCCH transmission/reception on the BWP (such as parameters used in existing BWP configurations); and/or Configuration including a beam failure recovery configuration such as RACH-related parameters, a list of candidate beams, beam failure recovery timer, recovery search space(s).

According to some embodiments, the WTRU may perform BWP switching actions as described above using such recovery BWP instead of BWP's configured for normal operation. This may have the benefit of allowing the network to configure what the WTRU may receive and transmit while in a recovery state. Upon reception of PDCCH with an indicated BWP ID, the WTRU may switch to the (normal) DL/UL BWP indicated by the PDCCH.

In an embodiment, a WTRU may be configured with candidate beams on BWP's other than the active BWP. The WTRU may select at least one such candidate beam for the purpose of beam failure recovery, and initiate random access procedure using resource associated with such candidate beam. The WTRU may transmit the PRACH on the candidate UL BWP and may monitor at least one recovery search space in specific PDCCH monitoring occasions on the candidate DL BWP without performing a BWP switching operation. The WTRU may perform BWP switching upon reception of PDCCH on a search space on the source or candidate BWP.

According to certain embodiments, a beam used for a PUCCH transmission may be determined based on at least one of a gNB configuration (e.g., RRC or MAC-CE), associated SSB (e.g., during initial access), and/or a new candidate beam (e.g., $q_{new}$) indicated.

In an embodiment, a WTRU may determine a beam for a first uplink transmission (e.g., PUCCH) based on the beam used for a second uplink transmission (e.g., PRACH, $q_{new}$), where the determined beam may be applied for the first uplink transmission an offset period later than a time that one or more events occurred after the second uplink transmission. The first uplink transmission may be an uplink transmission to send information including at least one of Hybrid Automatic Repeat Request Acknowledgement (HARQ-ACK), Channel State Information (CSI), and/or data using one or more uplink channels (e.g., PUCCH, PUSCH). The second uplink transmission may be an uplink transmission to indicate a determined or a preferred beam by a WTRU using one or more uplink channels (e.g., PRACH, SR, PUCCH). The second uplink transmission may be an indication of $q_{new}$ when beam failure is detected. The first uplink transmission and the second uplink transmission may use different uplink channels. For example, the first uplink transmission may use PUCCH and the second uplink transmission may use PRACH. For instance, the one or more events occurring after the second uplink transmission upon which the WTRU may determine a beam for the first uplink transmission may include at least one of the following: reception of a first PDCCH in a specific search space (e.g., recoverySearchSpace), reception of a HARQ-ACK for the second uplink transmission, and/or reception of confirmation information from a gNB responsive to the WTRU request sent in the second uplink transmission. In one example, the offset may be a predetermined number (e.g., 28 symbols). In some embodiments, the offset may be determined based on network type (e.g., TN or NTN), timing advance value of a WTRU, round trip time between a WTRU and a transmission node (e.g., gNB, satellite), and/or an indication value from a gNB. According to certain embodiments, the offset may be determined as a function of a predetermined number (e.g., 28 symbols) and a gNB indicated value (e.g., Koffset), where the gNB indicated value (e.g., Koffset) may be a cell-specific value (e.g., signaled via a SIB) or a WTRU-specific value (e.g., configured via WTRU-specific RRC or MAC-CE). Thus, for example, the offset may be 28 symbols+Koffset.

According to certain embodiments, a WTRU may use a same spatial filter (e.g., beam) for a PUCCH transmission (e.g., the first uplink transmission) as for the last PRACH transmission (e.g., the second uplink transmission) 28 symbols+Koffset after a last symbol of a first PDCCH reception in a search space provided by a parameter (e.g., recoverySearchSpaceId) for which the WTRU detects a DCI format with Cyclic Redundancy Check (CRC) scrambled by C-RNTI or MCS-C-RNTI (Modulation and Coding Scheme C-RNTI), and until the WTRU receives an activation command for PUCCH-Spatialrelationinfo.

In a (NTN) scenario (e.g., unlike TN), when a WTRU identifies beam failure or out-of-sync status (temporally), e.g., when the WTRU entered a tunnel or an area with signal blockage, the WTRU may determine whether it should find new candidate beam(s) or cell(s). For example, if a WTRU is located in the center of a beam (e.g., within a 100 km diameter beam footprint), the WTRU may determine that use of the current beam/cell can be resumed after coverage is recovered (e.g., after the WTRU exits the tunnel). Thus, when such a WTRU declares Radio Link Failure (RLF) or beam failure, it may immediately start performing initial cell search or new candidate beam search even though the WTRU may still be in the tunnel, etc. (and thus unable to find a beam/cell). In such a scenario, the WTRU would unnecessarily consume battery life searching for a beam/cell when there is none available.

In an embodiment, the WTRU may be configured and/or indicated to suspend BFR (e.g., stop counting BFI) or RLM/RLF (e.g., stop counting out-of-sync or suspend/reset T310 timer), and/or may enter a "suspended" communication mode (e.g., a second communication mode, an inactive communication mode, a pending mode, a backup mode, etc.), when it identifies a particular condition. For instance, the condition may include one or more of the location of the WTRU, a time-related parameter, and/or a first timer that may be configured/indicated to the WTRU. For example, in an embodiment, the WTRU may determine its location (e.g., geographical location of the WTRU based on sensor and/or positioning mechanism) and may know that a particular location is within a tunnel, an area with signal blockage, or an area with signal strength below a threshold. In an embodiment, the WTRU may determine that a time-related condition or parameter, such as a time-specific operation of the WTRU or an anticipated/planned behavior of the WTRU exists (e.g., a time window in which the WTRU may turn off receiver to save power, a time duration during which the WTRU may be within a signal blockage area or an out-of-coverage area). In another example, after the WTRU passes a location, moving in a particular direction (e.g., toward a tunnel or other area with signal blockage), a pre-configured pattern of time stamps (as an example of the time-related parameter) may be used for identifying the particular condition. According to an embodiment, the WTRU may initiate and/or set the first timer when certain (pre-)condition(s) are met, e.g., BFD/RLF and/or beam, channel, signal quality, and/or strength metric(s), being below a threshold. When the first timer expires, the WTRU may enter suspended communication mode.

According to an embodiment, when the WTRU is in the suspended communication mode, one or more WTRU-specific resources, channels, and/or signals are suspended.

For example, one or more (WTRU-dedicated) DL resources (e.g., a PDCCH associated with a CORESET), a (semi-persistent-scheduled or configured-grant-based) PDSCH, or a CSI-RS, etc. configured for the WTRU may no longer be transmitted to the WTRU until the WTRU returns to a normal communication mode, e.g., RRC-connected mode with a gNB (e.g., cell/BWP) that was the serving-gNB and/or the serving-cell before entering the suspended communication mode. The one or more (e.g., WTRU-dedicated) DL resources being suspended and/or released may be used for other purposes (e.g., allocation to other WTRU(s)). The WTRU may assume that the configured DL resources are no longer valid or not available in the suspended communication mode. Therefore, the WTRU may skip monitoring and/or receiving the one or more configured DL resources in the suspended communication mode.

In other examples, one or more (WTRU-dedicated) UL resources (e.g., a PUCCH, a (semi-persistent-scheduled or configured-grant-based) PUSCH, or SRS configured for the WTRU may no longer be transmitted from the WTRU until the WTRU returns to a normal communication mode (e.g., RRC-connected mode with a gNB (e.g., cell/BWP) that was the serving-gNB and/or the serving-cell before entering the suspended communication mode, etc.). The one or more (e.g., WTRU-dedicated) UL resources being suspended/released may be used for other purposes (e.g., allocation to other WTRU(s)). The WTRU may assume that the one or more configured UL resources are no longer valid or not available in the suspended communication mode. Therefore, the WTRU may drop/skip a UL transmission in the configured UL resource in the suspended communication mode.

In some embodiments, one or more resources, channels, and/or signals, e.g., cell-specific (and/or broadcast/multicast) resources, channels, and/or signals, may remain available to the WTRU. For example, one or more DL resources (e.g., a PDCCH (associated with a CSS), an SSB, or a CSI-RS (e.g., for tracking, as a TRS, etc.) configured to the WTRU may (still) be transmitted to the WTRU. When the WTRU returns to a normal communication mode, the WTRU may transmit a (pre-defined or pre-configured) "comeback" signal (e.g., a resume-indication resource/signal, a (P)RACH, a RACH-like pre-defined and/or pre-configured signal, a scheduling request (SR), an SR-like pre-defined and/or pre-configured signal, etc.) based on receiving (e.g., measuring and/or decoding) the one or more first DL resources. This may provide benefits in terms of latency reduction in returning to a normal communication mode and/or reliability in communications. In other examples, one or more UL resources (e.g., a PUCCH, an SRS, or (P)RACH, etc.) configured for the WTRU may still be transmitted from the WTRU. When the WTRU returns to a normal communication mode, this may provide benefits in terms of latency reduction (e.g., where the gNB may successfully receive an uplink transmission of the one or more first UL resources before the comeback signal is transmitted from the WTRU).

According to an embodiment, the WTRU may be configured to start a second timer when it enters the suspended communication mode for dictating when the suspended communication mode expires. After the second timer expires, the WTRU may commence a cell-reselection procedure or (RACH-based) cell search procedure to re-attach to a cell. The second timer may be pre-defined or configured by the gNB. The duration of the second timer may be configured, set, and/or indicated from the gNB to the WTRU.

The first timer (e.g., during which the gNB keeps certain resources dedicated to the WTRU just prior to entering suspended communication mode) may be configured, e.g., by a gNB. The WTRU may use at least one of the resource(s) (e.g., resume indication resource(s)) to indicate whether the WTRU has returned to being in-coverage.

In an embodiment, a WTRU may (be configured to) send information to a gNB about the expected time interval during which the WTRU will be out-of-coverage (hereinafter sometimes referred to as "coverage gap information"). The expected time interval may be determined, e.g., by the WTRU, based on the WTRU's location, speed, and/or direction of movement.

The expected time interval during which the WTRU will be out-of-coverage may be referred to herein as out-of-coverage gap, coverage gap, out-of-coverage interval, coverage interval, out-of-sync gap, out-of-sync interval, and/or out-of-coverage time window. The coverage gap may be indicated in units of ms or slots. In some embodiments, the WTRU may send coverage gap information to a gNB if one or more of the following conditions are met. For example, the conditions may include if the WTRU is expected to still be in the same cell (or beam) after the coverage gap, there is no alternative network (e.g., TN), satellite, cell (or beam) during the coverage gap, the coverage gap is expected to be shorter than a threshold, the gNB configured the reporting of coverage gap information, the WTRU has a capability to report the coverage gap (e.g., capability to determine a coverage gap), and/or the WTRU is located within a coverage gap zone, wherein the coverage gap zone may be configured, indicated, and/or informed by a gNB. The coverage gap information may include one or more of following: start and/or end time; time length; start and/or end location; WTRU's direction of movement and/or speed; coverage loss level (e.g., in dB); and/or expected time to send resume request signal. The coverage gap information may be signaled via a pre-configured uplink resource.

In an embodiment, if a timer (e.g., the second timer, or a timer configured separately from the first timer) expires, the WTRU may be configured to perform initial cell search procedure (e.g., or at least RACH procedure, for instance, if the WTRU remains in the same cell/beam).

Hereafter, RS may be interchangeably used with one or more of CSI-RS, DM-RS, SSB and SRS.

The one or more thresholds configured herein may be preconfigured and/or indicated by the gNB. For example, the indication may be based on one or more of RRC, MAC CE and DCI.

In an embodiment, a WTRU may trigger beam quality measurement of a set of beams/BWPs (e.g., current active BWP/beam and/or neighboring beams/BWPs) and may report measurement results to a gNB. For example, the WTRU may support one or more of the following operations: monitoring beams (e.g., RSs) and/or BWPs, beam failure detection (BFD) counter, selecting one or more beams/BWPs based on new candidate beams/BWPs, triggering WTRU measurement/report process, receiving of gNB confirmation(s), and/or reporting of the measurement results.

According to an embodiment, the WTRU may be configured with one or more monitoring beams and/or BWPs. By measuring the beams and/or the BWPs, the WTRU may trigger beam quality measurement of a set of BWPs. The one or more monitoring beams and/or BWPs may be beams and/or BWPs of the current active BWP. In this case, the WTRU may be configured with a threshold from the gNB. Based on the configured threshold, the WTRU may detect beam failure. For example, if the measured quality (e.g., one or more of Hypothetical PDCCH BLER, RSRP, RSRQ, SINR, etc.) of the one or more monitoring beams/BWPs is lower than (or equal to) the threshold, the WTRU may deem it a beam failure. The WTRU may be configured with different thresholds to be applied to different beams and/or BWPs or groups of beams and/or BWPs. For example, the WTRU may be configured with a first threshold for the active beam and/or BWP and a second threshold for the neighboring beams and/or BWPs. The one or more monitoring beams and/or BWPs may be beams and/or BWPs of the current active BWP and the neighboring beams and/or BWPs.

In an embodiment, the WTRU may be configured with a threshold from the gNB. Based on the configured threshold, the WTRU may detect beam failure. For example, if the measured quality (e.g., one or more of Hypothetical PDCCH BLER, RSRP, RSRQ, SINR and etc.) of the one or more monitoring beams and/or BWPs is lower than (or equal to) the threshold, the WTRU may deem it a beam failure. The WTRU may configured with different thresholds, associated with different beams and/or BWPs or groups of beams and/or BWPs. For example, the WTRU may be configured with a first threshold for the active beam and/or BWP and a second threshold for the neighboring beams and/or BWPs. As another example, if difference between the measured quality (e.g., one or more of Hypothetical PDCCH BLER, RSRP, RSRQ, SINR and etc.) of the beams and/or BWPs of the current beam and/or BWP and the measured quality of the beams and/or BWPs of the neighboring beams and/or BWPs is larger than (or equal to) the threshold, the WTRU may detect the beam failure. The WTRU may monitor the quality of one or more beams and/or BWPs of the configured neighboring beams and/or BWPs. The WTRU may decide the one or more beams and/or BWPs to monitor based on one or more of: gNB indication and/or activation, WTRU position and/or neighboring beams/BWPs positions, and/or WTRU measurements. In an embodiment, the WTRU may receive gNB indication and/or activation to indicate the one or more beams and/or BWPs of the configured neighboring beams and/or BWPs. The indication may be based one or more of RRC, MAC CE and DCI. In an embodiment, the WTRU may determine the one or more beams and/or BWPs based on WTRU position and/or neighboring beam/BWPs positions. For example, the WTRU may determine the N closest beams and/or BWPs to the WTRU for monitoring. In an embodiment, the WTRU may measure the quality of neighboring beams and/or BWPs with larger periodicity (i.e., less frequently) than the periodicity of the active beam and/or BWP. If the beam quality of the neighboring beam is greater than (or equal to) a first threshold, the WTRU may monitor the neighboring beams and/or BWPs. The WTRU measurement of the neighboring beams may be triggered if the quality of the beams and/or BWPs of the current active beam and/or BWP becomes lower than (or equal to) a second threshold.

According to an embodiment, the WTRU may be configured with one or more BFD counters. Based on the one or more BFD counters, the WTRU may trigger WTRU measurement and/or report process. For example, if the number of detected beam failures is larger than (or equal to) a threshold, the WTRU may trigger WTRU measurement and/or report process. The WTRU may be configured with different BFD counters for different beams and/or BWPs. For example, the WTRU may be configured with a first BFD counter for the active beam and/or BWP and a second BFD counter for the neighboring beams and/or BWPs.

In an embodiment, the WTRU may be configured with one or more new candidate beams and/or BWPs for new beam selection. The one or more new candidate beams and/or BWPs may be beams and/or BWPs of the current active BWP and the neighboring beams and/or BWPs. The WTRU may be configured with a threshold from the gNB. Based on the configured threshold, the WTRU may select one or more new beams. For example, the threshold may be a measured quality (e.g., one or more of Hypothetical PDCCH BLER, RSRP, RSRQ, SINR, etc.) of the one or more new candidate beams and/or BWPs. If the measured quality is larger than (or equal to) the threshold, the WTRU may select one or more best beams and/or BWPs of the one or more new candidate beams and/or BWPs. The WTRU may be configured with different thresholds for different beams and/or BWPs or groups of beams and/or BWPs. For example, if the WTRU may be configured with a first threshold for the active beam and/or BWP and a second threshold for the neighboring beams and/or BWPs.

In an embodiment, the WTRU may decide the one or more beams and/or BWPs for new candidate beams based on gNB indication and/or activation. For example, the WTRU may receive gNB indication and/or activation to indicate the one or more beams and/or BWPs of the configured neighboring beams and/or BWPs. The indication may be based on one or more of RRC, MAC CE and DCI. Additionally or alternatively, the WTRU may decide the one or more beams and/or BWPs for new candidate beams based on WTRU position and/or neighboring beams and/or BWPs positions. The WTRU may determine the one or more beams and/or BWPs based on WTRU position and/or neighboring beam and/or BWPs positions. For example, the WTRU may determine the N beams and/or BWPs that are closest to the WTRU for new candidate beams and/or BWPs. Additionally or alternatively, the WTRU may decide the one or more beams and/or BWPs for new candidate beams based on WTRU measurement. The WTRU may measure the quality of neighboring beams and/or BWPs with larger periodicity (i.e., less frequently) than the periodicity of the active beam and/or BWP. If the beam quality of the neighboring beam is greater than (or equal to) a first threshold, the WTRU may monitor the neighboring beams and/or BWPs. The WTRU measurement of the neighboring beam may be triggered if the quality of the monitored beams and/or BWPs of the current active beam and/or BWP is lower than (or equal to) a second threshold.

According to an embodiment, if the WTRU detects one or more beam failures, the WTRU may trigger WTRU measurement/report process by transmitting one or more UL resources. The one or more UL resources may be on one or more of following: one or more PRACH resources, one or more PUCCH resources (e.g., scheduling request), and/or one or more PUSCH resources (dynamic grant based or existing configured grant). If the WTRU is configured with an UL resource, the WTRU may transmit the trigger in the UL resource. If the WTRU is configured with more than one UL resource, the WTRU may select of one or more UL resources. Each of the one or more UL resources may be associated with one or a group of selected new beams and/or BWPs in new beam selection procedure.

In an embodiment, if the WTRU triggers a measurement and/or report process, the WTRU may receive one or more gNB confirmations. The WTRU may be configured with one or more DL resources for the confirmation. The WTRU may receive one or more DL signals as a confirmation in the configured DL resources. The one or more DL resources may include one or more of the following: RS resources/ resource sets, CORESETs/Search Spaces, and/or Time/frequency resources for PDSCH transmission. The one or more DL signals may include, for example, DCI (WTRU specific or group specific) and/or RS resources/resource sets. For the WTRU specific DCI, the DCI may include PUSCH scheduling information to report the measurement result. If the WTRU is configured with more than one DL resource, the WTRU may support beam and/or BWP determination based on one or more of those DL resources. The WTRU may receive selection of one or more beams by receiving one or more DL resources, associated with the one or more beams, of more than one DL resource. For example, each of the one or more DL resources may be associated with one or a group of selected UL resources in the triggering procedure.

According to an embodiment, the WTRU may report the measurement results by using one or more UL resources. The one or more UL resources may include PUCCH (e.g., CSI report), PRACH (e.g., one PRACH sequence may indicate a selected new candidate beam/BWP), and/or PUSCH. For example, in an embodiment, the WTRU may be configured with one or more PUCCH resources to report the measurement results. The WTRU may receive an indication of one or more PUCCH resources to report the measurement results. The indication may be included within one or more of RRC, MAC CE, and/or DCI. As another example, in an embodiment, the WTRU may be configured with one or more PRACH resources to report the measurement results. The WTRU may receive an indication of one or more PRACH resources to report the measurement results. The indication may be included within one or more of RRC, MAC CE, and/or DCI. As yet another example, the WTRU may receive a scheduling DCI for PUSCH to report the measurement results. The scheduling DCI may be included within the confirmation DCI. If the WTRU is configured and/or indicated with an UL resource, the WTRU may report the measurement result in the UL resource. If the WTRU is configured with more than one UL resource, the WTRU may select of one or more of those UL resources for the report. Each of the one or more UL resources may be associated with one or a group of selected new beams and/or BWPs in new beam selection procedure or one or a group of received confirmation DL resources and/or BWPs. The measurement results may include one or more of the following: one or more of failed beam and/or BWP IDs, one or more of selected new beam and/or BWP IDs, candidate beam (RS) IDs (e.g., based on new beam selection); and/or availability indication (AC) (e.g., this field may indicate presence of the candidate beam (RS) IDs. See 3GPP TS 38.321, "Medium Access Control (MAC) protocol specification", v16.0.0, section 6.1.3.23).

In an embodiment, a WTRU may support a Beam Failure Recovery or BFR procedure based on aperiodic (AP) or semi-persistent (SP) RS. The BFR procedure may be based on one or more of: AP and/or SP (AP/SP) RS based monitoring (e.g., BFD RS measurement) for neighboring beams and/or BWPs, and/or multi-beam BFR request and/or AP/SP RS based new candidate beam selection.

For example, for AP/SP RS based monitoring (e.g., BFD RS measurement) for neighboring beams and/or BWPs, the WTRU may monitor the current active beam and/or BWP based on one or more of periodic RSs and/or neighboring beams and/or BWPs based on one or more AP/SP RS. The monitoring of the current active beam and/or BWP may be continuous based on the one or more of periodic RSs, while the monitoring of the neighboring beams and/or BWPs may be one-shot or time-window-based monitoring. For example, the WTRU may receive a trigger and/or activation of AP/SP RSs. Based on the triggered and/or activated AP/SP RSs, the WTRU may measure the triggered and/or activated AP/SP RSs within the one-shot or the time window. The trigger and/or activation may include one or more of the following configurations: one or more time durations for BFR, one or more thresholds for beam failure detection, one or more RS resource and/or resource set IDs for the trigger and/or activation, one or more CSI report config IDs for the trigger and/or activation, and/or UL resource to request BFR and/or report one or more selected new candidate beams.

If it is one time duration, then the time duration may be associated with all of the triggered and/or activated AP/SP RSs. If it is more than one time duration, then each time duration may be associated with one or a group of the triggered and/or activated AP/SP RSs.

If it is one threshold, then the threshold may be associated with all of the triggered and/or activated AP/SP RSs for beam failure detection. If it is more than one threshold, then each threshold may be associated with one or a group of the triggered and/or activated AP/SP RSs.

The resource type of each RS resource and/or resource set may be 'aperiodic' or 'semi-persistent'. Each RS resource and/or resource set may be configured with a time duration for BFR and/or UL resource to request BFR and/or report one or more selected new candidate beams.

Each of the one or more CSI report configs associated with the one or more CSI report config IDs may be configured with a config type 'aperiodic,' 'semi-persistent' or 'beam failure recovery'. Each of the one or more CSI report configs associated with the one or more CSI report config IDs may be configured with a time duration for BFR and/or UL resource to request BFR and/or report one or more selected new candidate beams.

The UL resource to request BFR and/or report one or more selected new candidate beams may be one or more of the following: PRACH resource, PUCCH resource (e.g., scheduling request), and/or PUSCH resource (dynamic grant based or existing configured grant based). The trigger and/or activation may be based on one or more of the following: DCI (group (e.g., DCI format 2_0) or WTRU-specific (e.g., one or more of DCI formats 0_0, 0_1, 0_2, 1_0, 1_1 and 1_2)), and/or MAC CE (e.g., SP-CSI-RS/SRS activation MAC CE).

For example, for multi-beam BFR request and/or AP/SP RS based new candidate beam selection, the WTRU may monitor current active beam and/or BWP based on one or more of periodic RSs. If the WTRU detects BFR, the WTRU may transmit a multi-beam BFR request (e.g., to neighboring beams/BWPs). In order to transmit a multi-beam BFR request, the WTRU may be configured with one or more of the following configurations: one or more UL resources to request BFR based on one or more of following, one or more TCI states and/or spatial relation information (e.g., spatialRelationInfos) to transmit the one or more UL resources, one or more confirmation resources for BFR request, one or more AP/SP RS resources and/or resource sets, one or more UL resources to report one or more selected new candidate beams, and/or one or more confirmation resources for new beam selection.

The one or more UL resources to request BFR may be based on one or more of following: one or more PRACH resources, one or more PUCCH resources (e.g., scheduling request), and/or one or more PUSCH resources (dynamic grant based or existing configured grant based). The one or more confirmation resources for BFR request may be one or more of following: RS resources and/or resource sets, CORESETs and/or Search Spaces, and/or Time/frequency resources for PDSCH transmission. Each of the one or more AP/SP RS resources and/or resource sets may be associated with each of the one or more UL resources to request BFR. The one or more AP/SP RS resources and/or resource sets may be used as one or more confirmation resources for BFR request. Each of the one or more UL resources to report one or more selected new candidate beams may be associated with each of the one or more AP/SP RS resources and/or resource sets. Each of the one or more confirmation resources for new beam selection may be associated with each of the one or more UL resources to report one or more selected new candidate beams. The one or more confirmation resources for new beam selection may be one or more of following: RS resources and/or resource sets, CORESETs and/or Search Spaces, and/or time and/or frequency resources for PDSCH transmission.

Figure 6:
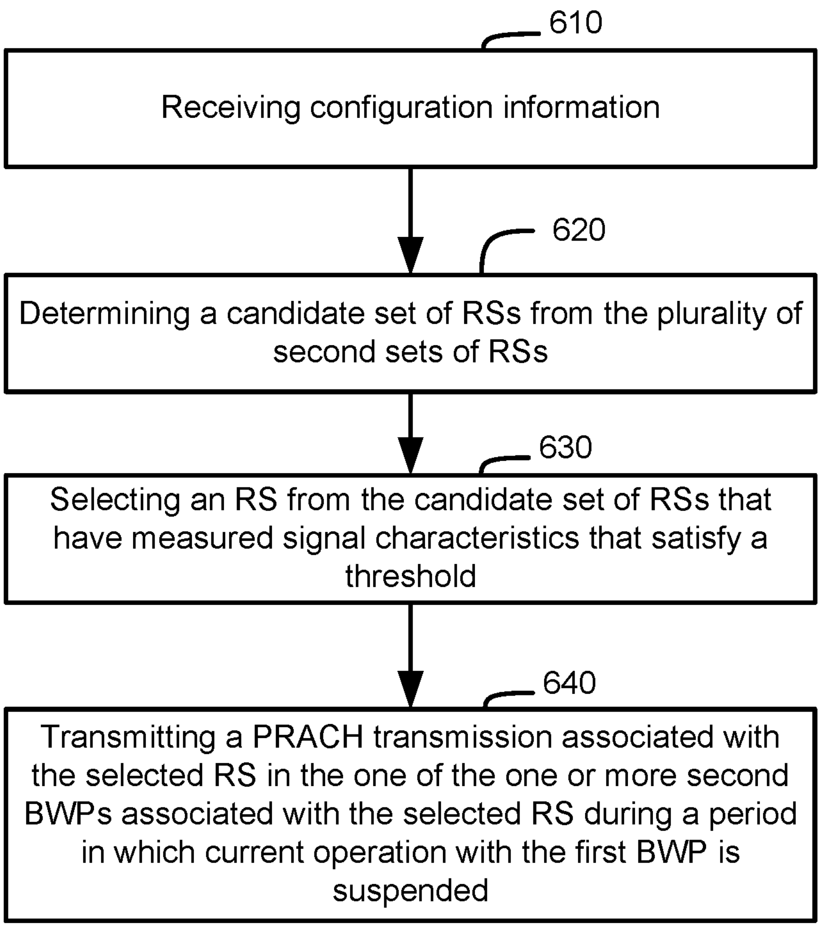
FIG. 6 is a flowchart illustrating a method of beam failure recovery in accordance with an embodiment.

FIG. 6 is a flowchart illustrating a representative method for beam failure recovery in accordance with an embodiment. In some embodiments, the method of FIG. 6 may be implemented by a WTRU, for example. As illustrated in the example of FIG. 6, the method may include, at 610, receiving configuration information. The configuration information may indicate a first set of reference signals (RSs) comprising one or more first RSs associated with a first bandwidth part (BWP) of a cell, and a plurality of second sets of RSs. Each of the plurality of second sets of RSs may include one or more second RSs, and each of the one or more second RSs may be associated with one of one or more second BWPs of the cell. The method may also include, at 620, determining a candidate set of RSs from the plurality of second sets of RSs based on any of a location and a timing advance value associated with the WTRU. The method may further include, at 630, selecting an RS from the candidate set of RSs that have measured signal characteristics that satisfy a threshold. The method may then include, at 640, transmitting a physical random access channel (PRACH) transmission associated with the selected RS in the one of the one or more second BWPs associated with the selected RS during a period in which current operation with the first BWP is suspended.

According to an embodiment, the determining 620 of the candidate set of RSs may include one of (i) selecting one of the plurality of second sets of RSs, and/or (ii) generating and/or populating the candidate set of RSs with one or more of the one or more second RSs of one or more of the plurality of second sets of RSs.

In some embodiments, the determining 620 may include determining the one or more of the candidate set of RSs that have measured signal characteristics that satisfy a threshold based on measurements of the one or more of second RSs of the candidate set of RS made during another period in which current operation with the first BWP is suspended. In one embodiment, the method may include the WTRU determining at least one of the location and the timing advance value associated with the WTRU. According to an embodiment, the one or more first RSs and/or the one or more second RSs may include beams or beam measurement reference signals (BMRSs).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided below with respect to FIGS. 1A-1E.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

REFERENCES

The following references may have been referred to hereinabove and are incorporated in full herein by reference.

[1] 3GPP TS 38.213, "NR Physical layer procedures for control", v16.1.0

[2] 3GPP TS 38.214, "NR Physical layer procedures for data", v16.6.0

[3] 3GPP TS 38.321, "Medium Access Control (MAC) protocol specification", v16.0.0

[4] 3GPP TS 38.331, "Radio Resource Control (RRC) protocol specification", v16.0.0

[5] 3GPP TS 38.212, "NR Multiplexing and channel coding", v16.6.0

[6] 3GPP TS 37.213, "Physical layer procedures for shared spectrum channel access", v16.6.0

[7] 3GPP TR 38.805, "Study on New Radio access technology; 60 GHz unlicensed spectrum"

[8] 3GPP TR 38.807, "Study on requirements for NR beyond 52.6 GHz", v16.0.0

[9] 3GPP TR 38.913, "Study on New Radio access technology; Next Generation Access Technologies"

[10] 3GPP RP-181435, "New SID: Study on NR beyond 52.6 GHz"

[11] 3GPP RP-193259, "New SID: Study on supporting NR from 52.6 GHz to 71 GHz"

[12] 3GPP RP-193229, "New WID on Extending current NR operation to 71 GHz".

What is claimed is:

1. A method, implemented in a Wireless Transmit/Receive Unit (WTRU), the method comprising:

receiving configuration information indicating:

a first set of reference signals (RSs) comprising one or more first RSs associated with a first bandwidth part (BWP) of a cell, and a plurality of second sets of RSs, wherein each of the plurality of second sets of RSs comprises one or more second RSs, and wherein each of the one or more second RSs is associated with one of one or more second BWPs of the cell;

determining a candidate set of RSs from the plurality of second sets of RSs based on any of a location and a timing advance value associated with the WTRU;

selecting an RS from the determined candidate set of RSs that has measured signal characteristics that satisfy a threshold, wherein the selected RS is associated with a corresponding second BWP of the one or more second BWPs; and transmitting a physical random access channel (PRACH) transmission associated with the selected RS in the corresponding second BWP during a period in which current operation with the first BWP is suspended.

2. The method of claim 1, wherein the determining of the candidate set of RSs comprises one of: (i) selecting one of the plurality of second sets of RSs, or (ii) populating the candidate set of RSs with at least one of the one or more second RSs of one or more of the plurality of second sets of RSs.

3. The method of claim 1, wherein the determining of the candidate set of RSs comprises:

determining the one or more of the candidate set of RSs that have measured signal characteristics that satisfy a threshold based on measurements of the one or more of second RSs of the candidate set of RSs made during another period in which the current operation with the first BWP is suspended.

4. The method of claim 1, comprising performing measurements of the one or more second RSs of the candidate set of RSs during another period in which the current operation with the first BWP is suspended.

5. The method of claim 1, wherein any of the location and the timing advance value is determined by the WTRU.

6. The method of claim 1, wherein any of the one or more first RSs and the one or more second RSs comprise any of beams or beam measurement reference signals (BMRSs).

7. A wireless transmit/receive unit (WTRU) comprising:

a transceiver configured to receive configuration information indicating:

a first set of reference signals (RSs) comprising one or more first RSs associated with a first bandwidth part (BWP) of a cell, and a plurality of second sets of RSs, wherein each of the plurality of second sets of RSs comprises one or more second RSs, and wherein each of the one or more second RSs is associated with one of one or more second BWPs of the cell;

a processor configured to:

determine a candidate set of RSs from the plurality of second sets of RSs based on any of a location and a timing advance value associated with the WTRU; and select an RS from the determined candidate set of RSs that has measured signal characteristics that satisfy a threshold, wherein the selected RS is associated with a corresponding second BWP of the one or more second BWPs; and the transceiver configured to transmit a physical random access channel (PRACH) transmission associated with the selected RS in the corresponding second BWP during a period in which current operation with the first BWP is suspended.

8. The WTRU of claim 7, wherein, to determine the candidate set of RSs, the processor is configured to one of: (i) select one of the plurality of second sets of RSs, or (ii) populate the candidate set of RSs with at least one of the one or more second RSs of one or more of the plurality of second sets of RSs.

9. The WTRU of claim 7, wherein the processor is configured to determine the one or more of the candidate set of RSs that have measured signal characteristics that satisfy a threshold based on measurements of the one or more of second RSs of the candidate set of RSs made during another period in which the current operation with the first BWP is suspended.

10. The WTRU of claim 7, wherein the processor is configured to perform measurements of the one or more second RSs of the candidate set of RSs during another period in which the current operation with the first BWP is suspended.

11. The WTRU of claim 7, wherein the processor is configured to determine any of the location and the timing advance value for the WTRU.

12. The WTRU of claim 7, wherein any of the one or more first RSs and the one or more second RSs comprise any of beams or beam measurement reference signals (BMRSs).

13. A wireless transmit/receive unit (WTRU) comprising:

means for receiving configuration information indicating:

a first set of reference signals (RSs) comprising one or more first RSs associated with a first bandwidth part (BWP) of a cell, and a plurality of second sets of RSs, wherein each of the plurality of second sets of RSs comprises one or more second RSs, and wherein each of the one or more second RSs is associated with one of one or more second BWPs of the cell;

means for determining a candidate set of RSs from the plurality of second sets of RSs based on any of a location and a timing advance value associated with the WTRU;

means for selecting an RS from the determined candidate set of RSs that has measured signal characteristics that satisfy a threshold, wherein the selected RS is associated with a corresponding second BWP of the one or more second BWPs; and means for transmitting a physical random access channel (PRACH) transmission associated with the selected RS in the corresponding second BWP during a period in which current operation with the first BWP is suspended.

14. The WTRU of claim 13, wherein the means for determining comprises one of: (i) means for selecting one of the plurality of second sets of RSs, or (ii) means for populating the candidate set of RSs with at least one of the one or more second RSs of one or more of the plurality of second sets of RSs.

15. The WTRU of claim 13, wherein the means for determining comprises means for determining the one or more of the candidate set of RSs that have measured signal characteristics that satisfy a threshold based on measurements of the one or more of second RSs of the candidate set of RSs made during another period in which the current operation with the first BWP is suspended.

16. The WTRU of claim 13, comprising means for performing measurements of the one or more second RSs of the candidate set of RSs during another period in which the current operation with the first BWP is suspended.

17. The WTRU of claim 13, comprising means for determining at least one of the location and the timing advance value for the WTRU.

18. The WTRU of claim 13, wherein any of the one or more first RSs and the one or more second RSs comprise any of beams or beam measurement reference signals (BMRSs).

* * * * *